US012538315B2

(12) United States Patent
Zewail et al.

(10) Patent No.: US 12,538,315 B2
(45) Date of Patent: Jan. 27, 2026

(54) MULTIPLE TB CONFIGURATION IN MULTI-PDSCH GRANT

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Qingjiang Tian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 632 days.

(21) Appl. No.: 17/818,941

(22) Filed: Aug. 10, 2022

(65) Prior Publication Data

US 2023/0076119 A1 Mar. 9, 2023

Related U.S. Application Data

(60) Provisional application No. 63/238,090, filed on Aug. 27, 2021.

(51) Int. Cl.
*H04W 72/23* (2023.01)
*H04L 1/1812* (2023.01)
*H04W 72/1273* (2023.01)

(52) U.S. Cl.
CPC ........... *H04W 72/23* (2023.01); *H04L 1/1819* (2013.01); *H04W 72/1273* (2013.01)

(58) Field of Classification Search
CPC .. H04W 72/23; H04W 72/1273; H04L 1/1819
See application file for complete search history.

(56) References Cited

U.S. PATENT DOCUMENTS

| | | | | |
|---|---|---|---|---|
| 2010/0159939 A1* | 6/2010 | Jeong | ................... | H04L 5/0046 455/450 |
| 2013/0178220 A1* | 7/2013 | Lee | ....................... | H04L 5/0048 455/450 |
| 2015/0358060 A1* | 12/2015 | Park | ......................... | H04L 1/06 370/329 |
| 2017/0126376 A1* | 5/2017 | Wang | ..................... | H04L 5/006 |
| 2021/0282171 A1* | 9/2021 | Wu | ..................... | H04W 72/569 |
| 2023/0076119 A1* | 3/2023 | Zewail | .................. | H04L 1/1819 |
| 2023/0336284 A1* | 10/2023 | Gao | ...................... | H04L 1/1819 |
| 2024/0080861 A1* | 3/2024 | Zeng | ..................... | H04L 5/0058 |

OTHER PUBLICATIONS

Translation of CN115334678A (Year: 2021).*

* cited by examiner

*Primary Examiner* — Afshawn M Towfighi
(74) *Attorney, Agent, or Firm* — Procopio, Cory, Hargreaves & Savitch LLP

(57) ABSTRACT

A network node may configure a UE with more than one codeword transmission for each PDSCH and transmit DCI including multi-PDSCH grant scheduling multiple PDSCHs. The DCI may include an indication that a second TB is disabled for each PDSCH indicated by the multi-PDSCH grant. The UE may receive the DCI including multi-PDSCH grant scheduling multiple PDSCHs, the DCI including the indication that the second TB is disabled for each PDSCH indicated by the multi-PDSCH grant, and understand that the multiple PDSCHs scheduled by the multi-PDSCH grant. In one aspect, the indication may include a combination of the MCS and RV value of the associated multiple PDSCHs. In another aspect, the indication may include a pattern of the RV vector (or RVID) values of associated multiple PDSCHs.

26 Claims, 13 Drawing Sheets

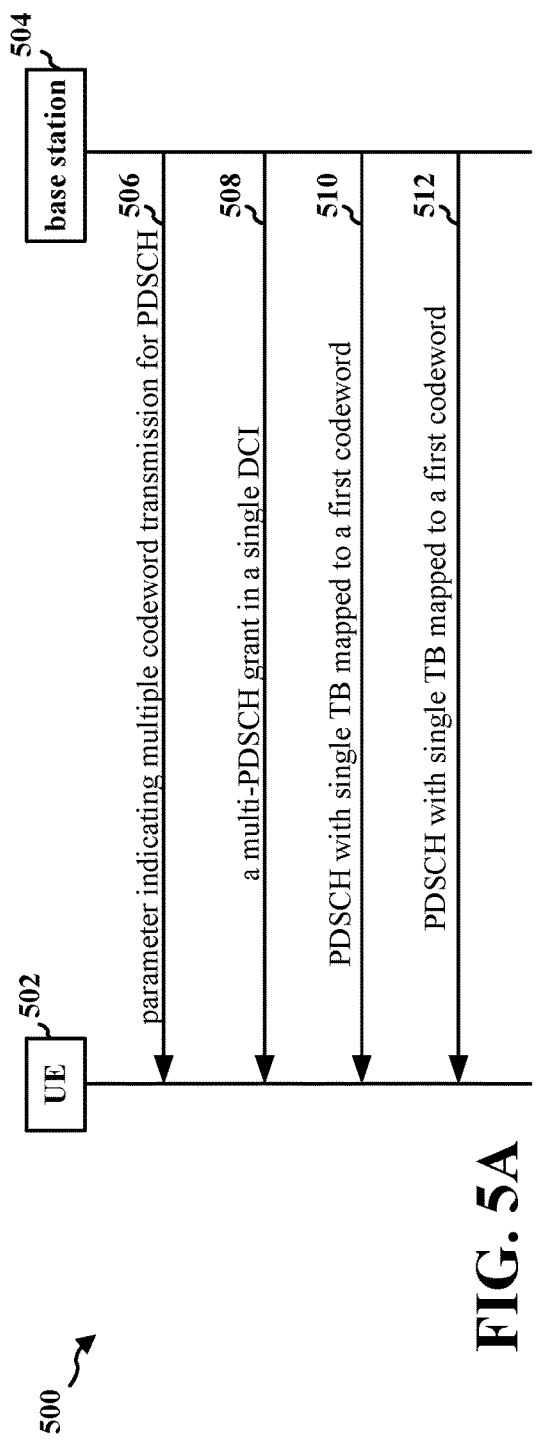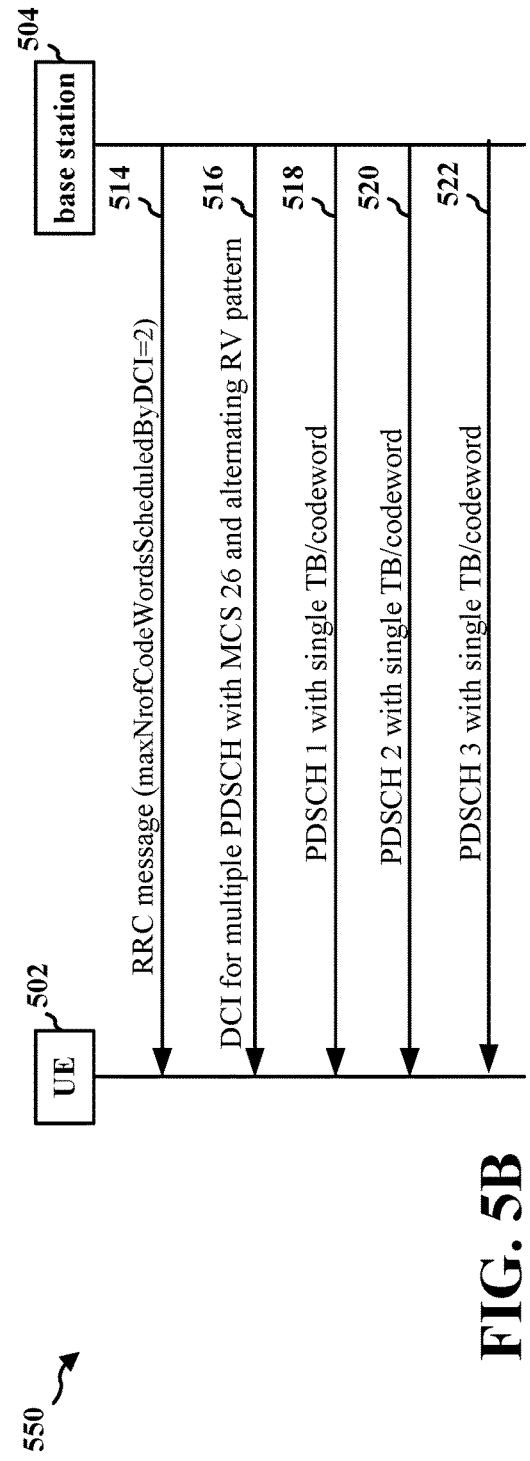
FIG. 5A
FIG. 5B

MULTIPLE TB CONFIGURATION IN MULTI-PDSCH GRANT

CROSS REFERENCE TO RELATED APPLICATION(S)

This application claims the benefit of and priority to U.S. Provisional Application Ser. No. 63/238,090, entitled "MULTIPLE TB CONFIGURATION IN MULTI-PDSCH GRANT" and filed on Aug. 27, 2021, which is expressly incorporated by reference herein in its entirety.

TECHNICAL FIELD

The present disclosure relates generally to communication systems, and more particularly, to a method for wireless communication including multiple transport block (TB) configuration in a multi-physical downlink shared channel (PDSCH) grant.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE), and the UE may be configured to receive a parameter indicating that two codeword transmission for physical downlink shared channel (PDSCH) transmissions is enabled by a network node, receive a multi-PDSCH grant in a single downlink control information (DCI) comprising an indication that a second transport block is disabled for each PDSCH indicated by the multi-PDSCH grant from the network node; and receive each PDSCH indicated by the multi-PDSCH grant based on a disablement of the second transport block from the network node In another aspect of the disclosure, a method, a computer-readable medium, and an apparatus are provided. The apparatus may include a network node, and the network node may be configured to transmit a parameter indicating that two codeword transmission for PDSCH transmissions is enabled for a UE, transmit a multi-PDSCH grant in a single DCI comprising an indication that a second transport block is disabled for each PDSCH indicated by the multi-PDSCH grant for the UE, and transmit each PDSCH indicated by the multi-PDSCH grant based on a disablement of the second transport block for the UE To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 5A and 5B re communication diagrams of methods of wireless communication.

DETAILED DESCRIPTION

Figure 1:
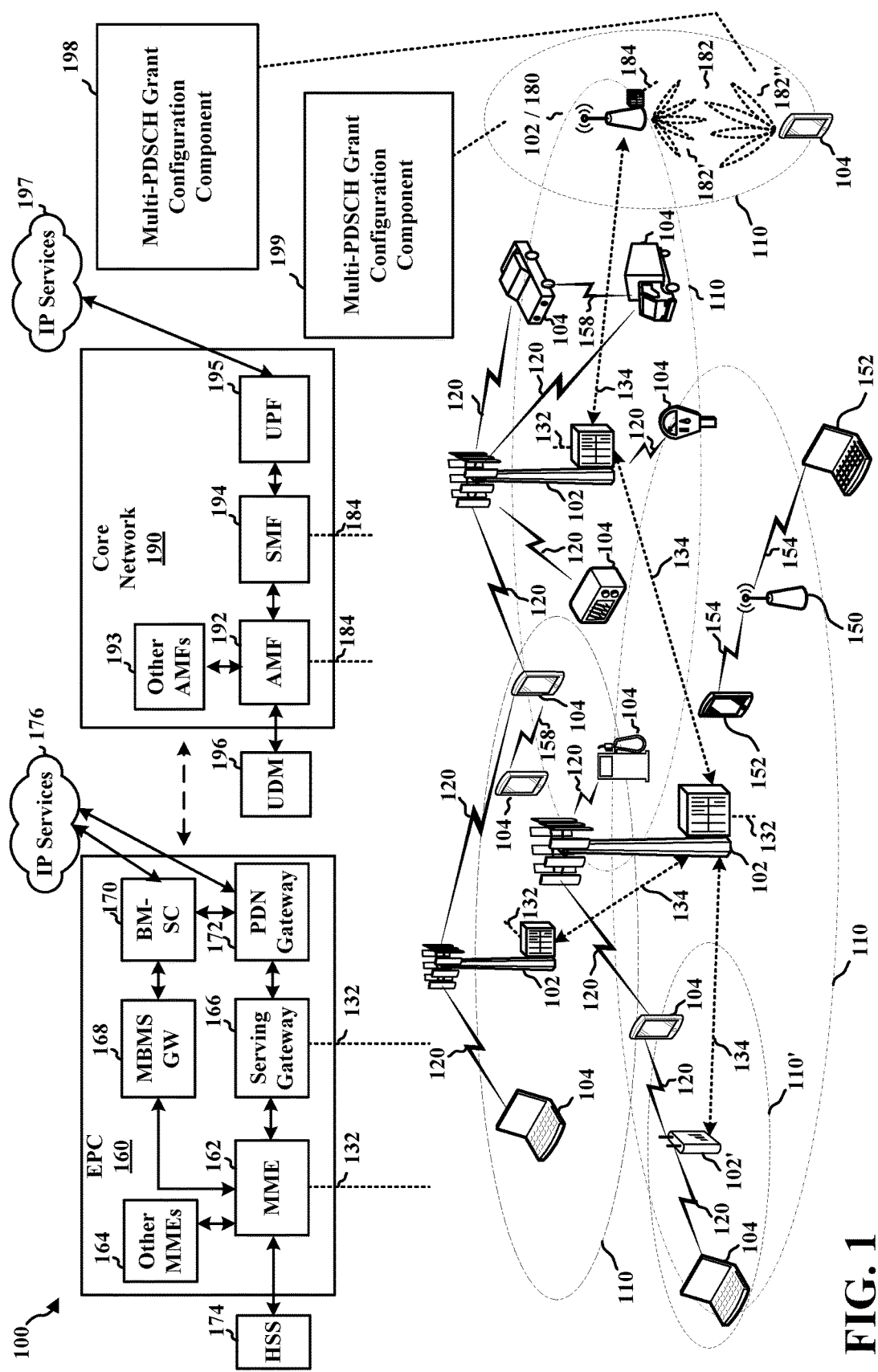
FIG. 1 is a diagram illustrating an example of a wireless communications system and an access network.

A network node may provide a user equipment (UE) with a single downlink control information (DCI) to schedule multiple physical downlink shared channel (PDSCH) transmissions to the UE (e.g., multiple downlink (DL) TBs) or multiple physical uplink shared channel (PUSCH) transmissions from the UE (e.g., multiple uplink (UL) TBs). In some aspects, the resource allocation may be across multiple slots. The single DCI may reduce the control signaling overhead and/or may reduce monitoring and processing of scheduling physical downlink control channel (PDCCH) at the UE. As an example, a UE may avoid monitoring for and/or processing scheduling PDCCH in each slot if the network node provides the UE with a single DCI that allocates resources in multiple slots. As well, the network node may reduce control signaling overhead by reducing the number of DCI transmitted to the UE. A PDSCH may include multiple codewords in a single PDSCH transmission. For example, the PDSCH may have a higher layer parameter that enables a maximum number of codewords scheduled by DCI that allows for 2, or possibly more, codewords. If a maximum number of 2 codewords is enabled, there may be times when the network node does not transmit multiple codewords in a PDSCH transmission. In such aspects, a second transport block (TB) may be disabled for the PDSCH transmission. The network node may indicate that the TB is disabled through a particular combination of a modulation and coding scheme (MCS) and redundancy version (RV) indicated in the DCI for the PDSCH.

Aspects presented herein enable a network node to indicate to a UE that a second TB is disabled for multiple PDSCH scheduled through a single DCI. In contrast to a single PDSCH transmission, a DCI scheduling resources for multiple PDSCH transmissions indicates a MCS and an individual RV for each PDSCH. In some aspects, a combination of a particular value of the MCS and at least one of the RVs in the single DCI may indicate that the second TB is disabled for each of the PDSCHs scheduled by the DCI. In some aspects, a combination of a particular value of the MCS together with a particular pattern of RVs values may indicate to the UE that the second TB is disabled for each of the PDSCHs scheduled by the DCI. The use of the pattern of RV values with the particular MCS value may provide the network node with added flexibility in scheduling combinations of MCS and RV for the various PDSCHs while continuing to enable the second TB, e.g., without indicating that the second TB is disabled.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a multi-PDSCH grant configuration component 198 configured to receive, from a base station, a parameter enabling two codeword transmission for PDSCH transmissions, receive, from the base station, a multi-PDSCH grant in a single DCI including an indication that a second transport block is disabled for each PDSCH indicated by the multi-PDSCH grant, and receive, from the base station, each PDSCH indicated by the multi-PDSCH grant based on a disablement of the second transport block. In certain aspects, the base station 180 may include a multi-PDSCH grant configuration component 199 configured to transmit, to a UE, a parameter enabling two codeword transmission for PDSCH transmissions, transmit, to the UE, a multi-PDSCH grant in a single DCI including an indication that a second transport block is disabled for each PDSCH indicated by the multi-PDSCH grant, and transmit each PDSCH indicated by the multi-PDSCH grant based on a disablement of the second transport block. Although the following description may be focused on 5G NR, the concepts described herein may be applicable to other similar areas, such as LTE, LTE-A, CDMA, GSM, and other wireless technologies.

Figure 2:
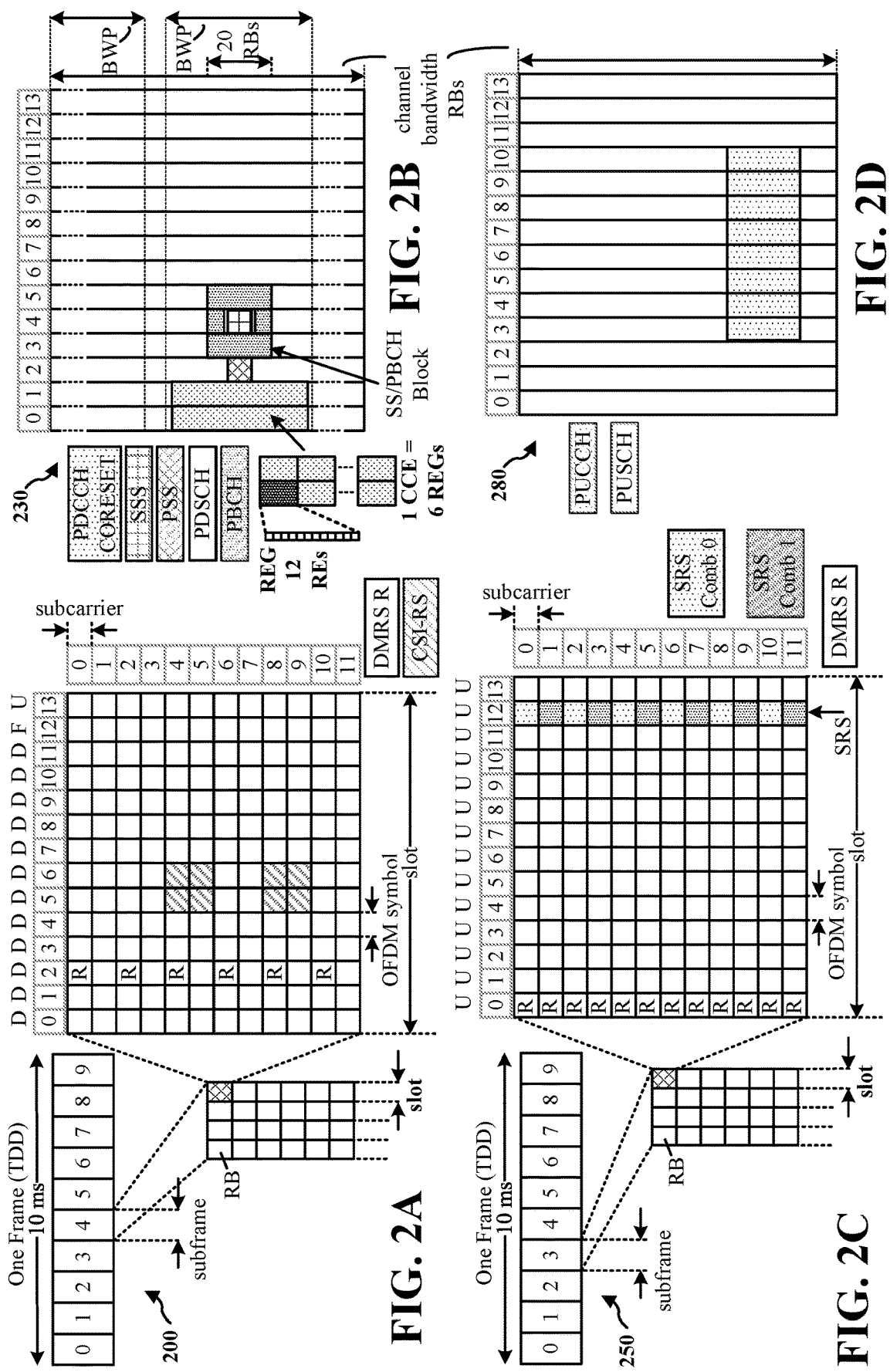
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE A numerology, SCS, and cyclic prefix

| $\mu$ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
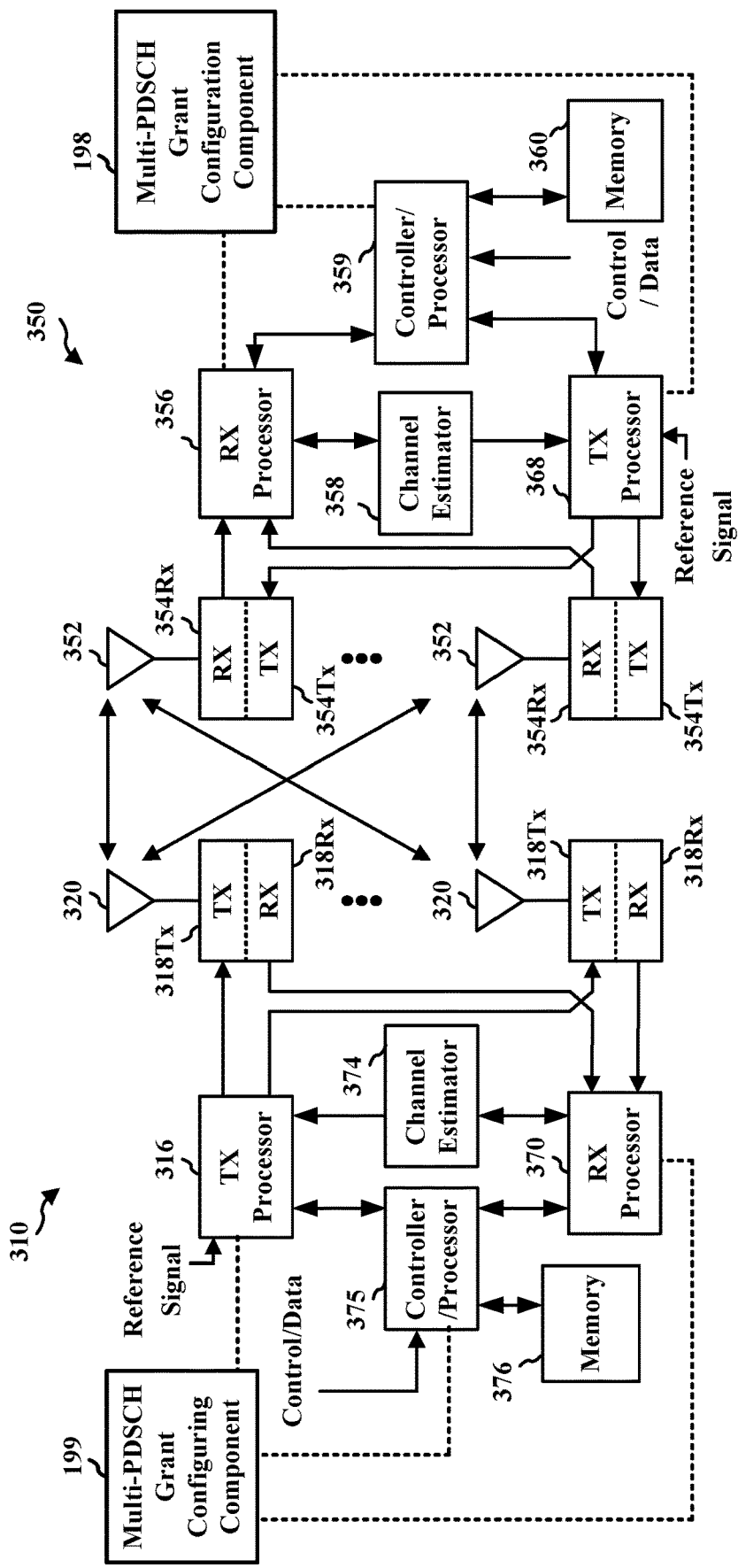
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the multi-PDSCH grant configuration component 198 of FIG. 1. At least one of the TX processor 316, the RX processor 370, and the controller/processor 375 may be configured to perform aspects in connection with the multi-PDSCH grant configuring component 199 of FIG. 1.

A network node may provide a UE with a single downlink control information (DCI) to schedule multiple PDSCH transmissions to the UE (e.g., multiple downlink (DL) TBs) or multiple PUSCH transmissions from the UE (e.g., multiple uplink (UL) TBs). In some aspects, the resource allocation may be across multiple slots. The single DCI may reduce the control signaling overhead and/or may reduce monitoring and processing of scheduling PDCCH at the UE. As an example, a UE may avoid monitoring for and/or processing scheduling PDCCH in each slot if the network node provides the UE with a single DCI that allocates resources in multiple slots. As used herein, a "single DCI" refers to one DCI message, e.g., one control message within a PDCCH transmission, that may include multiple parameters relating to control information to the UE.

In some aspects, the multi-PDSCH/PUSCH DCI may indicate the allocated resources based on a time domain resource allocation (TDRA) table. Table B illustrates an example TDRA table. Table B is merely an example of a TDRA table to illustrate the concept, and a DCI grant may be based on any of various TDRA tables.

For a single DCI that schedules multiple PUSCHs, the TDRA table may include entries such that each row indicates multiple PUSCHs (that may be non-continuous in time-domain). Each PUSCH may have a separate start and length indicator value (SLIV) and mapping type. The number of scheduled PUSCHs may be implicitly indicated by the number of indicated valid SLIVs in the row of the TDRA table signalled in DCI. For a DCI that can schedule multiple PDSCHs, the TDRA may include entries such that each row indicates multiple PDSCHs. Each PDSCH may have a separate SLIV and mapping type. The number of scheduled PDSCHs may be implicitly indicated by the number of indicated valid SLIVs in the row of the TDRA table signalled in DCI. The DCI may indicate multiple PUSCH/PDSCH grants that are continuous resource in a time-domain or that are non-continuous in the time domain. The multiple SLIVs for a particular index of the TDRA table may be indicated in various ways. For example, each row may use S, L columns or may use SLIV values. Regardless of the way in which the multiple SLIVs are indicated, one row index may correspond to multiple SLIVs.

TABLE B

TDRA table

| row index | PUSCH mapping type | K2 | SLIV |
|---|---|---|---|
| 0 | Type A | (0 ... 32) | (0 .127), (0 .127) |
| 1 | Type B | (0 ... 32) | (0 .127), ., (0 .127) |

As illustrated, each row of the TDRA table may row indicate resource allocations for multiple PUSCHs or for multiple PDSCHs, e.g., two to eight PUSCHs/PDSCHs. For PUSCH, each row of the TDRA table may indicate a corresponding $K_2$ parameter that indicates the slot where UE is to transmit the first PUSCH of the multiple PUSCHs. For example, $K_2$ may indicate a time period between the DCI and the slot for the transmission of the first PUSCH. For PDSCH, each row of the TDRA table may indicate a corresponding $K_0$ parameter that indicates the slot where UE is to receive the first PDSCH of the multiple PDSCHs. Each PUSCH/PDSCH may have a separate SLIV and mapping type. The number of scheduled PUSCHs/PDSCHs may be indicated by the number of indicated valid SLIVs in the row indicated by an index indicated in the scheduling DCI. As an example, a TDRA for continuous multi-PUSCH may be signalled to the UE for multi-PUSCH DCI in pusch-TimeDomainAllocationListForMultiPUSCH.

The DCI scheduling multiple PUSCHs may indicate one or transmission parameters that are the same for each scheduled PUSCHs and may be referred to as common to each of the scheduled PUSCHs. In some aspects, the DCI may indicate a common frequency domain resource allocation (FDRA) parameter, a modulation and coding scheme (MCS) parameter, or a common rank parameter that are shared by each of the PUSCHs scheduled by the DCI. In one aspect, the starting and/or ending positions of the multiple PUSCHs may be provided by a time domain resource allocation TDRA parameter, e.g., as described in connection with Table B. For example, the TDRA parameter may include multiple SLIVs, associated with the starting and/or ending positions of the multiple PUSCH.

In one aspect, the UL grant may indicate the first hybrid automatic repeat request (HARQ) process ID, and the later transmissions may use incremental HARQ process IDs. In another aspect, each PUSCH of the multiple PUSCHs may be associated with separate parameters, e.g., separate new data indicator (NDI), or separate redundancy version (RV) identifier (ID) (RVID).

A multiple PDSCH (multi-PUSCH) grant feature may be provided to similarly reduce control overhead for scheduling downlink transmissions. The multi-PDSCH grant may refer to one DL grant, e.g., a single DCI message, that schedules multiple PDSCH transmissions. That is, a network node may transmit one DL grant scheduling resources for multiple PDSCH transmissions.

Figure 4A:
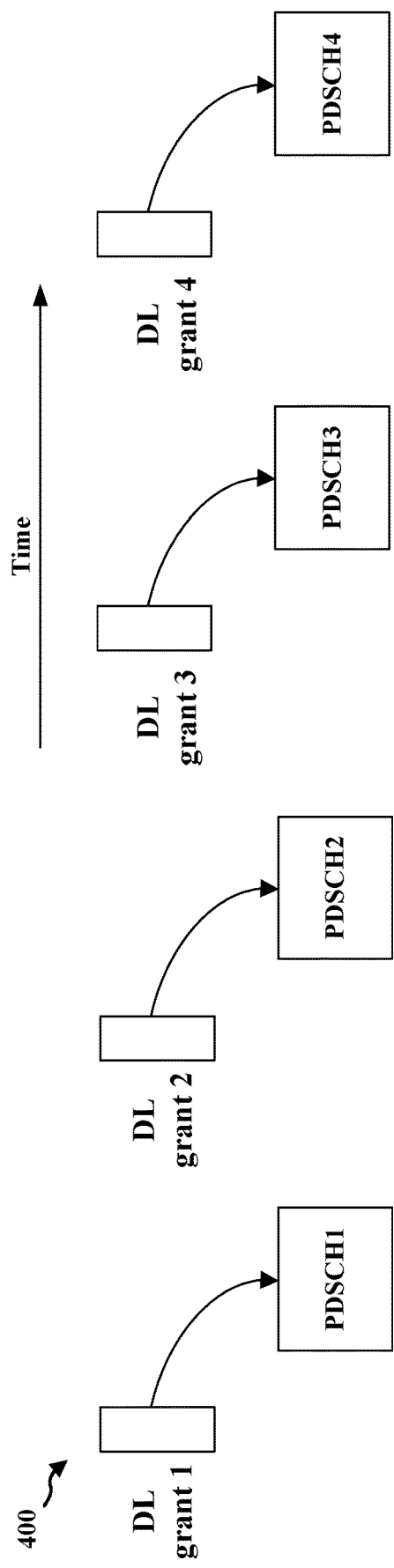
FIG. 4A is a diagram illustrating an example of single PUSCH scheduling.
Figure 4B:
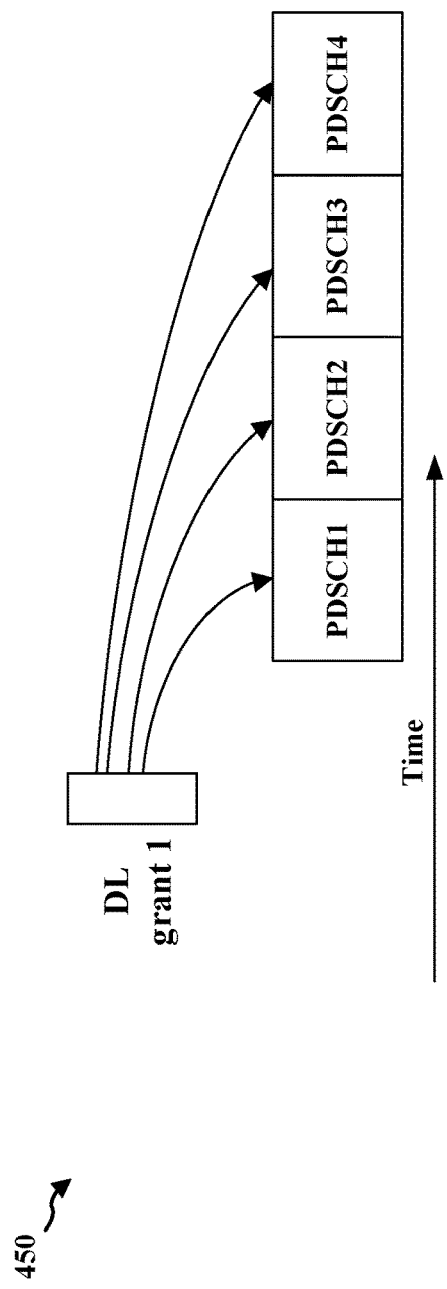
FIG. 4B is a diagram illustrating an example of multiple PUSCH scheduling.

FIGS. 4A and 4B are diagrams 400 and 450, respectively, of single PDSCH scheduling and multiple PDSCH (multi-PDSCH) scheduling. As shown in FIG. 4A, diagram 400 includes single PDSCH scheduling with multiple downlink (DL) grants, e.g., DL grant 1, DL grant 2, DL grant 3, and DL grant 4, as well as multiple PDSCHs, e.g., PDSCH1, PDSCH2, PDSCH3, and PDSCH4. As shown in FIG. 4B, diagram 450 includes multi-PDSCH scheduling with one DL grant, e.g., DL grant 1, as well as multiple PDSCHs, e.g., PDSCH1, PDSCH2, PDSCH3, and PDSCH4. FIGS. 4A and 4B show multi-PDSCH scheduling (FIG. 4B) can reduce the signaling overhead by including one DL grant, e.g., DL grant 1, compared to single PDSCH scheduling (FIG. 4A) which utilizes multiple DL grant, e.g., DL grant 1, DL grant 2, DL grant 3, and DL grant 4.

As shown in FIG. 4B, multiple PDSCH scheduling or multi-PDSCH scheduling may also be beneficial for reducing power consumption.

In higher frequency bands, such as a frequency band above 52.6 GHz, there may be a wider available bandwidth for wireless communication. A higher SCS may be used for the wireless communication to reduce phase noise and/or to utilize the wider available bandwidth. A higher SCS corresponds to shorter symbol and slot durations. In some aspects, the single DCI scheduling multiple PDSCH transmissions or multiple PUSCH transmissions may reduce overhead and/or may improve scheduling for shorter slot durations associated with a higher SCS. For example, the multi-PDSCH grant may help the network node to schedule longer downlink bursts.

In some instances, a time domain resource allocation (TDRA) in DCI, e.g., DCI 0_1, may indicate a combination of multiple PDSCHs, where candidate combinations may be configured by radio resource control (RRC) signaling. Moreover, multi-PDSCH scheduling may support a certain number of PDSCHs, e.g., up to 8 PDSCHs, that are accu-tinuous or intermittent in time domain.

The DCI scheduling multiple PDSCHs may indicate one or more common parameters that are shared for each of the PDSCH. For example, the DCI may indicate a MCS that is shared by each of the TBs of the multiple PDSCHs. As described in connection with the DCI for multiple PUSCH scheduling, the common parameters may include FDRA, rank, or other parameters that are shared by each of the multiple PDSCHs being scheduled by the DCI. An individual RV and/or NDI may be indicated for each of the multiple PDSCHs.

The PDSCHs of the multi-PDSCH, may include more than one transport block (TB) and corresponding more than one codeword. That is, each PDSCH of the multi-PDSCH may be configured to carry one or more TBs, and each TB may carry at least one codeword. The network node may transmit an indication or a parameter to enable the multiple TB.

The network node may enable the inclusion of multiple codeword transmission, e.g., in 2 TBs of a PDSCH transmission through a configuration of a higher layer parameter that indicates a maximum number of codewords scheduled by DCI (e.g., which may be referred to as "maxNrofCodeWordsScheduledByDCI") with a value of 2, e.g., in RRC signaling to the UE. If the maximum number is configured, or otherwise indicated, as "2", the network node may transmit PDSCH comprising two codewords, e.g., in 2 TBs, to a UE. If the maximum number is configured, or otherwise indicated, as "1", the network node may send a single codeword in a single TB of a PDSCH transmission.

For example, two TBs may be configured for each PDSCH, and two codewords may be scheduled on downlink transmission. In one aspect, both TBs may be enabled, and the first TB and the second TB may be mapped to a first codeword (codeword0) and a second codeword (codeword1), respectively.

If the transmission of multiple codewords, e.g., in multiple TBs, is enabled by the higher layer indication, there may be times when the network node does not transmit a second TB in the PDSCH. The network node may indicate in DCI to the UE that the network node will not transmit multiple TBs (and therefore is not going to transmit multiple codewords) in a PDSCH transmission so that the UE accurately receives the PDSCH transmission. For example, if both TBs are enabled, and the higher layer parameter indicates that two codeword transmission is enabled, the TB 1 and 2 may be mapped to codeword 0 and codeword 1, respectively. If only 1 TB is enabled (e.g., the second TB is disabled in the DCI), then the enabled TB may be mapped to the first codeword. Here, some aspects provide the two codeword transmission as an example of the multiple codeword transmission, but the current disclosure is not limited thereto. The maximum number of the multiple codeword transmission may be greater than or equal to two (2).

For a DCI scheduling a single PDSCH, the network node may indicate that the second TB is disabled, or will not be transmitted even though the higher layer parameter enables a maxNrofCodeWordsScheduledByDCI of 2, through a combination of an MCS of 26 and an RVID of 1. The UE may interpret the DCI to determine that the enabled TB, e.g., first TB, is mapped to the first codeword of the single PDSCH.

As noted above, the DCI scheduling multiple PDSCH may indicate a same MCS for the TBs of the PDSCHs. That is, a single MCS value indicated in the DCI may be commonly applied to each of the PDSCHs, which may include one or more TBs. Each TB may be configured with an individual RV and/or NDI. In some aspects, the RV or the NDI may be indicated per TB. That is, each TB of the more than one TB of the PDSCH may be scheduled with a separate RV and NDI.

Aspects presented herein enable a network node to indicate to a UE that a second TB is disabled for multiple PDSCH scheduled through a single DCI. In contrast to a single PDSCH transmission, a DCI scheduling resources for multiple PDSCH transmissions indicates a MCS (e.g., a common MCS) and an individual RV for each PDSCH, and individual RV is a single-bit field. In some aspects, a combination of a particular value of the common MCS and at least one of the RVs in the single DCI may indicate that the second TB is disabled for each of the PDSCHs scheduled by the DCI.

In some aspects, the DCI (e.g., multi-PDSCH grant) scheduling the multiple PDSCHs may use a combination of MCS and RV vector (or RVID) value to indicate that the second TB is disabled for each of the multiple PDSCHs. For example, if the combination of MCS=y and RV ID=x indicates that the second TB is disabled, the DCI may include the common MCS=y and the RV ID=x for each of the multiple PDSCHs scheduled by the DCI in order to indicate that the second TB is disabled.

In one aspect, a combination of the MCS 26 and the RV=1 for all PDSCHs may indicate to the wireless devices, e.g., the network node or the UE, that the associated at least one PB is disabled.

For example, the higher layer parameter maxNrofCodeWordsScheduledByDCI may be configured to enable 2 codewords to be transmitted in each PDSCH of the multiple PDSCHs, and the network node may disable the second TB of each of the multiple PDSCHs by transmitting the DCI including that the combination of the common MCS of 26 and the individual RVID of each of the multiple PDSCHs of 1.

As an example in which the DCI schedules 4 PDSCH transmissions, the DCI may provide that the MCS=26 and the RVID of the multiple PDSCHs is "1111" to indicate that the second TB of the multiple PDSCHs is disabled. The UE may receive the DCI including the multi-PDSCH grant scheduling the multiple PDSCHs indicating that the MCS=26 and the RVID is "1111," and understand that the second TB of the multiple PDSCHs are disabled for the multiple PDSCHs scheduled by the DCI. The example of four PDSCH is used merely to illustrate the concept, and the concept may be applied to a multi-PDSCH grant for any number of 2 or more PDSCH.

In some aspects, a combination of a particular value of the common MCS together with a particular pattern of RVs values may indicate to the UE that the second TB is disabled for each of the PDSCHs scheduled by the DCI. The use of the pattern of RV values with the particular common MCS value may provide the network node with added flexibility in scheduling combinations of MCS and RV for the various PDSCHs while continuing to enable the second TB, e.g., without indicating that the second TB is disabled. As an example, a form of an RV vector (or RVID) may be configured to indicate that the second TB is disabled for the multiple PDSCHs scheduled by the DCI. That is, the DCI including the multi-PDSCH grant scheduling the multiple PDSCHs may include a pattern of the RVID of the PDSCH that may indicate that the multiple PDSCHs may be disabled for the multiple PDSCHs scheduled by the DCI.

In some aspects, the pattern of RVID may include two RV indications of any two adjacent PDSCHs being different from each other to indicate that at least one TB is disabled for the multiple PDSCHs. In one aspect, the pattern of RV indications may include an alternating pattern of RV indications.

In one example, two TBs may be configured for the PDSCH, and the multi-PDSCH grant may schedule two (2) PDSCHs. The DCI including the multi-PDSCH grant may include the pattern of the RVID may be value of 10 or 01 for the two PDSCHs to indicate that the second TB may be disabled for the two PDSCHs scheduled by the multi-PDSCHs.

In another example, two TBs may be configured for the PDSCH, and the multi-PDSCH grant may schedule eight (8) PDSCHs. The DCI including the multi-PDSCH grant may include the pattern of the RVID may be value of 10101010 or 01010101 for the eight PDSCHs to indicate that the second TB may be disabled for the eight PDSCHs scheduled by the multi-PDSCHs. The examples of two PDSCHs or eight PDSCHs are used merely to illustrate the concept, and the concept may be applied for any number of two or more PDSCHs.

By using a pattern of the RVID of the PDSCH to indicate that the multiple PDSCHs may be disabled for the multiple PDSCHs scheduled by the DCI, the network node and the UE may improve the scheduling flexibility without increasing the data bit of the RVID by reserving the RVID for indicating the redundancy version of the PDSCH. For example, if a first transmission of a first codeword that was communicated via a first PDSCH with RV=0 and MCS 26 fails, the network node may determine to communicate the retransmission of the first codeword via a second PDSCH with RV=1, indicating that the second PDSCH includes a retransmission of the data that was previously transmitted with RV=0. As multiple PDSCH transmissions scheduled by a single DCI may experience similar channel conditions and may each need a retransmission, it may be helpful for the network node to indicate an RV=1 for each of the PDSCHs. The use of a particular pattern of RV IDs to indicate that a second TB is disabled enables the network node to retransmit 2 TB transmissions for each of the PDSCHs with RV=1 and without indicating that the second TB is disabled.

In some aspects, the use of the pattern of RV IDs along with the particular MCS may enabled the network node to indicate that the second TB is disabled without an increased number of bits in the DCI.

FIG. 5A is a communication diagram 500 of a method of wireless communication. The communication diagram 500 may include a UE 502 and a network node 504. The network node 504 may configure the UE 502 with more than one codeword transmission for each PDSCH and transmit DCI including multi-PDSCH grant scheduling multiple PDSCHs. The DCI may include an indication that a second TB is disabled for each PDSCH indicated by the multi-PDSCH grant. The UE 502 may receive the DCI including multi-PDSCH grant scheduling multiple PDSCHs, the DCI including the indication that the second TB is disabled for each PDSCH indicated by the multi-PDSCH grant, and understand that the multiple PDSCHs scheduled by the multi-PDSCH grant. The network node 504 may transmit each PDSCH indicated by the multi-PDSCH grant based on the disablement of the second transport block, and the UE 502 may receive each PDSCH indicated by the multi-PDSCH grant based on the disablement of the second transport block.

At 506, the network node 504 may transmit, to the UE 502, a parameter indicating that two codeword transmission for PDSCH transmissions is enabled. The UE 502 may receive, from the network node 504, a parameter indicating that two codeword transmission for PDSCH transmissions is enabled. The parameter enabling two codeword transmission for PDSCH transmissions may be configured using the higher layer parameter of an RRC message.

At 508, the network node 504 may transmit, to the UE 502, a multi-PDSCH grant in a single DCI including an indication that a second TB is disabled for each PDSCH indicated by the multi-PDSCH grant. The UE 502 may receive, from the network node 504, a multi-PDSCH grant in a single DCI including an indication that a second TB is disabled for each PDSCH indicated by the multi-PDSCH grant. Here, the multi-PDSCH grant may include a MCS (e.g., a common MCS) that is common to each PDSCH indicated by the multi-PDSCH grant and an individual RV indication for each PDSCH indicated by the multi-PDSCH grant.

In one aspect, the indication that a second TB is disabled for each PDSCH indicated by the multi-PDSCH grant may correspond to a combination of an MCS and a pattern of RV indications included in the single DCI. In one example, the MCS in the combination may be 26. In another example, each RV indication in the pattern of RV indications may correspond to a 1. For example, the DCI including the multi-PDSCH grant associated with the multiple PDSCHs may provide that the MCS of the multiple PDSCHs is 26 and the RVID of the multiple PDSCHs is 1 to indicate that the second TB of the multiple PDSCHs may be disabled.

In another aspect, the pattern of RV indications includes two RV indications of any two adjacent PDSCHs being different from each other. That is, the pattern of RV indications that may indicate that the second TB is disabled for each PDSCH indicated by the multi-PDSCH grant may include two RV indications of any two adjacent PDSCHs being different from each other. The pattern of RV indications may include an alternating pattern of RV indications.

For example, two TBs may be configured for the PDSCH. In one example, the multi-PDSCH grant may schedule two (2) PDSCHs, and the multi-PDSCH grant may include the pattern of the RVID of 10 or 01 for the two PDSCHs to indicate that the second TB may be disabled for the two PDSCHs scheduled by the multi-PDSCHs. In another example, the multi-PDSCH grant may schedule eight (8) PDSCHs, and The DCI including the multi-PDSCH grant may include the pattern of the RVID of 10101010 or 01010101 for the eight PDSCHs to indicate that the second TB may be disabled for the eight PDSCHs scheduled by the multi-PDSCH grant.

At 510, the network node 504 may transmit a PDSCH indicated by the multi-PDSCH grant based on a disablement of the second TB. The UE 502 may receive, from the network node 504, the PDSCH indicated by the multi-PDSCH grant based on a disablement of the second TB. At 512, the network node 504 may transmit another PDSCH indicated by the multi-PDSCH grant based on the disablement of the second TB. At 510 and 512, the network node 504 may transmit a single TB mapped to a first codeword for each PDSCH indicated in the multi-PDSCH grant. The UE 502 may receive each PDSCH indicated by the multi-PDSCH grant based on the disablement of the second TB by receiving a single TB mapped to a first codeword for each PDSCH indicated in the multi-PDSCH grant. Although this example is illustrated for an example of two PDSCHs at 510 and 512 scheduled by the DCI at 508, the concept may be applied for any number of two or more PDSCHs scheduled by a single DCI.

FIG. 5B shows a communication flow 550 between the UE 502 and the network node 504 in which the network node indicates that the second TB is disabled using a pattern of alternating RV ID values. At 514, the UE 502 may receive the RRC message signaling that the maxNrofCodeWordsScheduledByDCI=2, indicating that the maximum number of codewords is 2.

At 516, the UE 502 may receive a DCI scheduling multiple PDSCH and indicating an MCS=26 and a pattern of alternating RV ID values (e.g., "010 . . . " or "101 . . . ". The UE 502 may interpret the MCS=26 and alternating RV ID values to mean that the second TB is disabled for each PDSCH scheduled by the DCI.

Then, at 518, 520, at 522, the UE 502 may receive each of the PDSCH, having a single TB mapped to a single codeword. Although this example is illustrated for an example of three PDSCHs scheduled by the DCI 516, the concept may be applied for any number of two or more PDSCHs scheduled by a single DCI. As an example, for two PDSCHs, the alternating RV ID pattern at 516 may be "01" or "10". For four PDSCHs, the alternating RV ID pattern at 516 may be "1010" or "0101". For a larger number of PDSCHs, the pattern may be extended.

Figure 6:
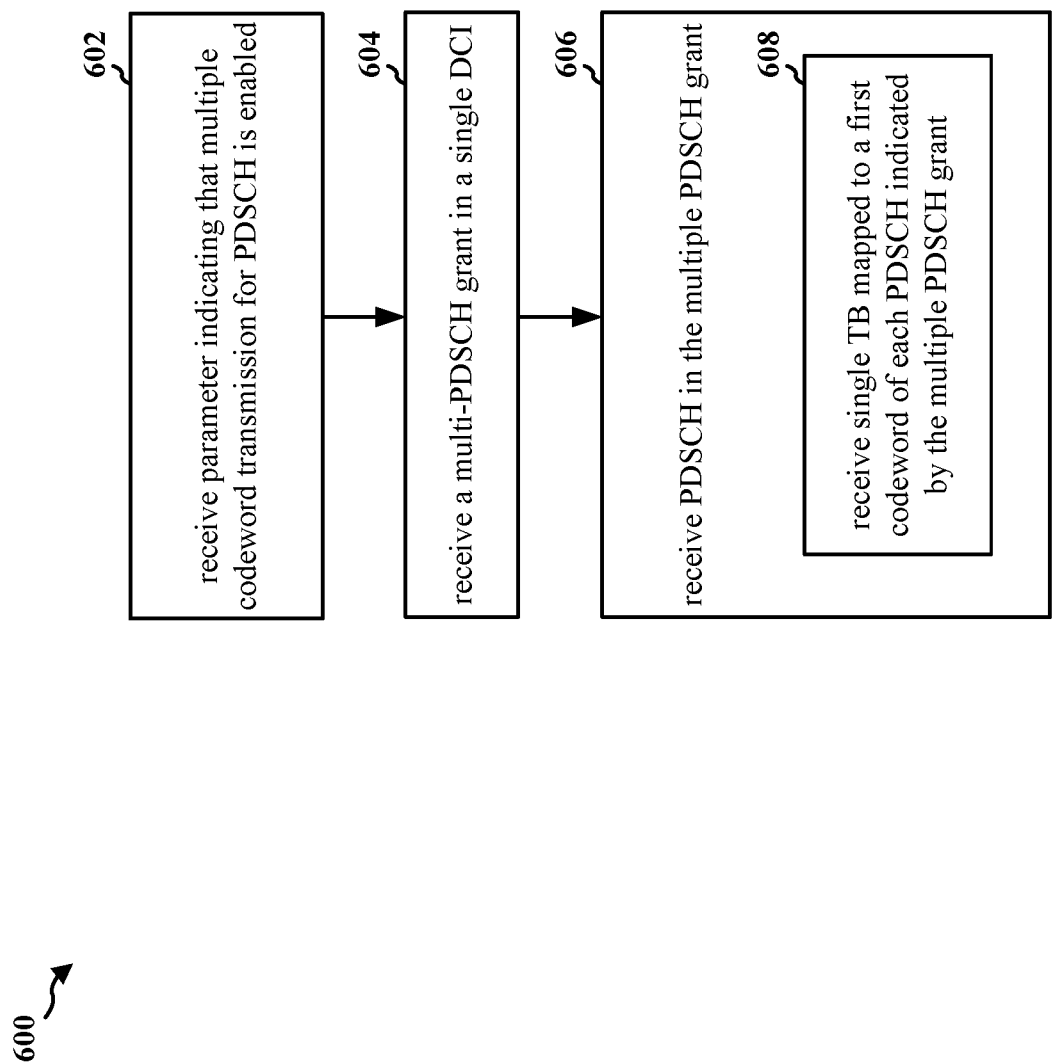
FIG. 6 is a flowchart of a method of wireless communication.

FIG. 6 is a flowchart 600 of a method of wireless communication. The method may be performed by a UE (e.g., the UE 104/502/1304; the apparatus 1004). The UE may be configured by the network node with more than one codeword transmission for each PDSCH. The UE may receive DCI including multi-PDSCH grant scheduling multiple PDSCHs, the DCI including the indication that the second TB is disabled for each PDSCH indicated by the multi-PDSCH grant, and understand that the multiple PDSCHs scheduled by the multi-PDSCH grant. The UE may receive each PDSCH indicated by the multi-PDSCH grant based on the disablement of the second transport block.

At 602, the UE may receive, from a network node, a parameter indicating that two codeword transmission for PDSCH transmissions is enabled. The parameter indicating the enablement of the two codeword transmission for PDSCH transmissions may be configured using the higher layer parameter of an RRC message. For example, the parameter may include maxNrofCodeWordsScheduled- ByDCI=2, indicating that the maximum number of codewords is 2. For example, at 506 and 514, the UE may receive, from the network node 504, a parameter indicating that two codeword transmission for PDSCH transmissions is enabled. Furthermore, 602 may be performed by a multi-PDSCH grant configuration component 198.

At 604, the UE may receive, from the network node, a multi-PDSCH grant in a single DCI including an indication that a second TB is disabled for each PDSCH indicated by the multi-PDSCH grant. Here, the multi-PDSCH grant may include a MCS (e.g., a common MCS) that is common to each PDSCH indicated by the multi-PDSCH grant and an individual RV indication for each PDSCH indicated by the multi-PDSCH grant. For example, at 508 and 516, the UE 502 may receive, from the network node 504, a multi-PDSCH grant in a single DCI including an indication that a second TB is disabled for each PDSCH indicated by the multi-PDSCH grant. Furthermore, 604 may be performed by the multi-PDSCH grant configuration component 198.

In one aspect, the indication that a second TB is disabled for each PDSCH indicated by the multi-PDSCH grant may correspond to a combination of an MCS and a pattern of RV indications included in the single DCI. In one example, the MCS in the combination may be 26. In another example, each RV indication in the pattern of RV indications may correspond to a 1. For example, the DCI including the multi-PDSCH grant associated with the multiple PDSCHs may provide that the MCS of the multiple PDSCHs is 26 and the RVID of the multiple PDSCHs is 1 to indicate that the second TB of the multiple PDSCHs may be disabled.

In another aspect, the pattern of RV indications includes two RV indications of any two adjacent PDSCHs being different from each other. That is, the pattern of RV indications that may indicate that the second TB is disabled for each PDSCH indicated by the multi-PDSCH grant may include two RV indications of any two adjacent PDSCHs being different from each other. The pattern of RV indications may include an alternating pattern of RV indications.

For example, two TBs may be configured for the PDSCH. In one example, the multi-PDSCH grant may schedule two (2) PDSCHs, and the multi-PDSCH grant may include the pattern of the RVID of 10 or 01 for the two PDSCHs to indicate that the second TB may be disabled for the two PDSCHs scheduled by the multi-PDSCHs. In another example, the multi-PDSCH grant may schedule eight (8) PDSCHs, and The DCI including the multi-PDSCH grant may include the pattern of the RVID of 10101010 or 01010101 for the eight PDSCHs to indicate that the second TB may be disabled for the eight PDSCHs scheduled by the multi-PDSCH grant.

At 606, the UE may receive, from the network node, the PDSCH indicated by the multi-PDSCH grant based on a disablement of the second TB. In one aspect, the UE may receive each PDSCH indicated by the multi-PDSCH grant based on the disablement of the second TB by receiving a single TB mapped to a first codeword for each PDSCH indicated in the multi-PDSCH grant (608). For example, at 510, 512, 518, 520, and 522, the UE 502 may receive, from the network node 504, the PDSCH indicated by the multi-PDSCH grant based on a disablement of the second TB. Furthermore, 606 and 608 may be performed by the multi-PDSCH grant configuration component 198.

Figure 7:
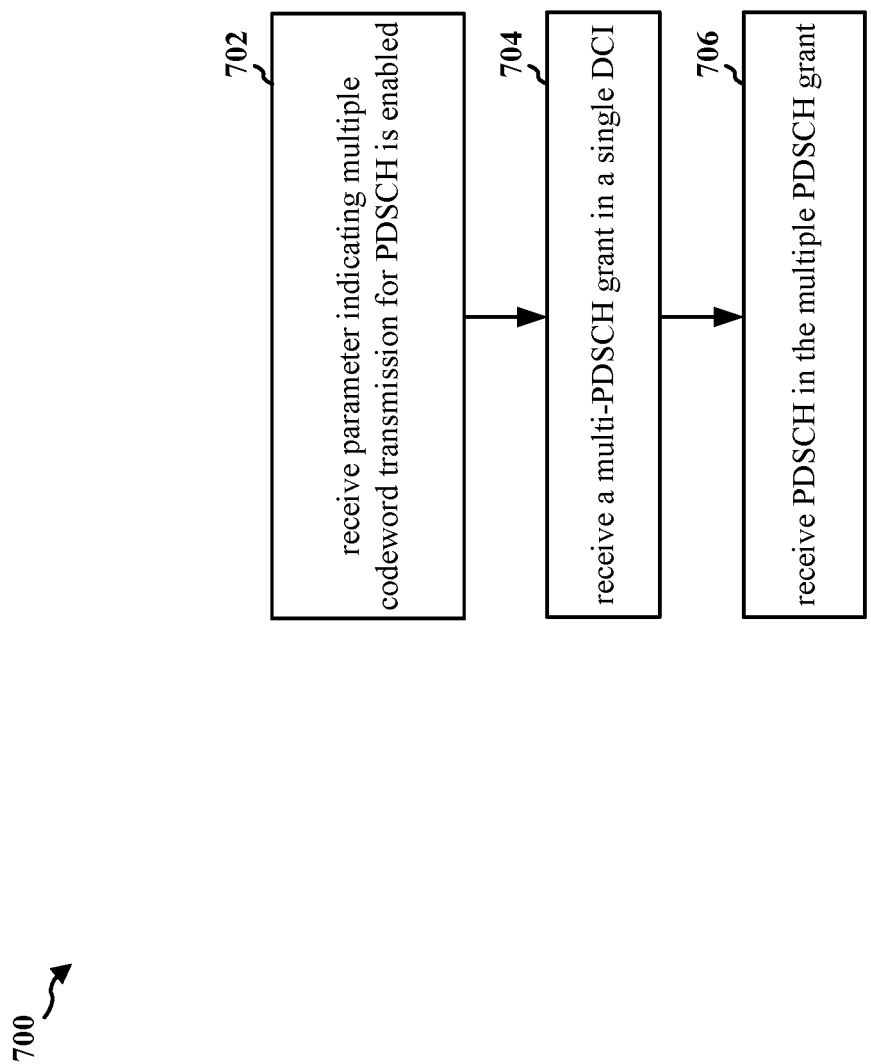
FIG. 7 is a flowchart of a method of wireless communication.

FIG. 7 is a flowchart 700 of a method of wireless communication. The method may be performed by a UE (e.g., the UE 104/502/1304; the apparatus 1004). The UE may be configured by the network node with more than one codeword transmission for each PDSCH. The UE may receive DCI including multi-PDSCH grant scheduling multiple PDSCHs, the DCI including the indication that the second TB is disabled for each PDSCH indicated by the multi-PDSCH grant, and understand that the multiple PDSCHs scheduled by the multi-PDSCH grant. The UE may receive each PDSCH indicated by the multi-PDSCH grant based on the disablement of the second transport block.

At 702, the UE may receive, from a network node, a parameter indicating that two codeword transmission for PDSCH transmissions is enabled. The parameter indicating the enablement of the two codeword transmission for PDSCH transmissions may be configured using the higher layer parameter of an RRC message. For example, the parameter may include maxNrofCodeWordsScheduledByDCI=2, indicating that the maximum number of codewords is 2. For example, at 506 and 514, the UE may receive, from the network node 504, a parameter indicating that two codeword transmission for PDSCH transmissions is enabled. Furthermore, 702 may be performed by a multi-PDSCH grant configuration component 198.

At 704, the UE may receive, from the network node, a multi-PDSCH grant in a single DCI including an indication that a second TB is disabled for each PDSCH indicated by the multi-PDSCH grant. Here, the multi-PDSCH grant may include a MCS (e.g., a common MCS) that is common to each PDSCH indicated by the multi-PDSCH grant and an individual RV indication for each PDSCH indicated by the multi-PDSCH grant. For example, at 508 and 516, the UE 502 may receive, from the network node 504, a multi-PDSCH grant in a single DCI including an indication that a second TB is disabled for each PDSCH indicated by the multi-PDSCH grant. Furthermore, 704 may be performed by the multi-PDSCH grant configuration component 198.

In one aspect, the indication that a second TB is disabled for each PDSCH indicated by the multi-PDSCH grant may correspond to a combination of an MCS and a pattern of RV indications included in the single DCI. In one example, the MCS in the combination may be 26. In another example, each RV indication in the pattern of RV indications may correspond to a 1. For example, the DCI including the multi-PDSCH grant associated with the multiple PDSCHs may provide that the MCS of the multiple PDSCHs is 26 and the RVID of the multiple PDSCHs is 1 to indicate that the second TB of the multiple PDSCHs may be disabled.

In another aspect, the pattern of RV indications includes two RV indications of any two adjacent PDSCHs being different from each other. That is, the pattern of RV indications that may indicate that the second TB is disabled for each PDSCH indicated by the multi-PDSCH grant may include two RV indications of any two adjacent PDSCHs being different from each other. The pattern of RV indications may include an alternating pattern of RV indications.

For example, two TBs may be configured for the PDSCH. In one example, the multi-PDSCH grant may schedule two (2) PDSCHs, and the multi-PDSCH grant may include the pattern of the RVID of 10 or 01 for the two PDSCHs to indicate that the second TB may be disabled for the two PDSCHs scheduled by the multi-PDSCHs. In another example, the multi-PDSCH grant may schedule eight (8) PDSCHs, and The DCI including the multi-PDSCH grant may include the pattern of the RVID of 10101010 or 01010101 for the eight PDSCHs to indicate that the second TB may be disabled for the eight PDSCHs scheduled by the multi-PDSCH grant.

At 706, the UE may receive, from the network node, the PDSCH indicated by the multi-PDSCH grant based on a disablement of the second TB. For example, at 510, 512, 518, 520, and 522, the UE 502 may receive, from the network node 504, the PDSCH indicated by the multi-PDSCH grant based on a disablement of the second TB. Furthermore, 706 and 708 may be performed by the multi-PDSCH grant configuration component 198.

Figure 8:
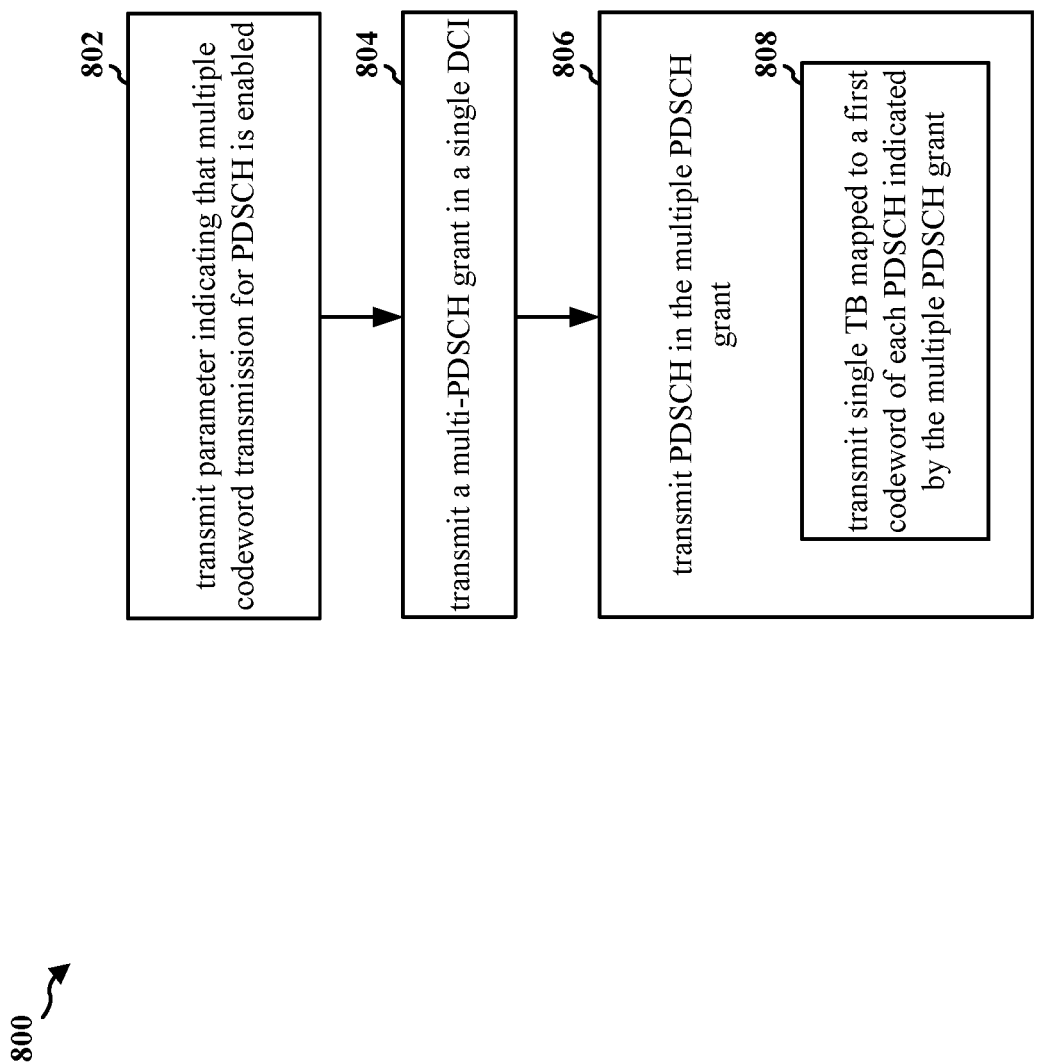
FIG. 8 is a flowchart of a method of wireless communication.

FIG. 8 is a flowchart 800 of a method of wireless communication. The method may be performed by a network node (e.g., the base station 102/180/504/1302; the network entity 1102/1206). The network node may configure the UE with more than one codeword transmission for each PDSCH and transmit DCI including multi-PDSCH grant scheduling multiple PDSCHs. The DCI may include an indication that a second TB is disabled for each PDSCH indicated by the multi-PDSCH grant. The network node may transmit each PDSCH indicated by the multi-PDSCH grant based on the disablement of the second transport block.

At 802, the network node may transmit, to the UE, a parameter indicating that two codeword transmission for PDSCH transmissions is enabled. The parameter indicating the enablement of the two codeword transmission for PDSCH transmissions may be configured using the higher layer parameter of an RRC message. For example, the parameter may include maxNrofCodeWordsScheduledByDCI=2, indicating that the maximum number of codewords is 2. For example, at 506 and 514, the network node 504 may transmit, to the UE 502, a parameter indicating that two codeword transmission for PDSCH transmissions is enabled. Furthermore, 802 may be performed by a multi-PDSCH grant configuring component 199.

At 804, the network node may transmit, to the UE, a multi-PDSCH grant in a single DCI including an indication that a second TB is disabled for each PDSCH indicated by the multi-PDSCH grant. Here, the multi-PDSCH grant may include a MCS (e.g., a common MCS) that is common to each PDSCH indicated by the multi-PDSCH grant and an individual RV indication for each PDSCH indicated by the multi-PDSCH grant. For example, at 508 and 516, the network node 504 may transmit, to the UE 502, a multi-PDSCH grant in a single DCI including an indication that a second TB is disabled for each PDSCH indicated by the multi-PDSCH grant. Furthermore, 804 may be performed by the multi-PDSCH grant configuring component 199.

In one aspect, the indication that a second TB is disabled for each PDSCH indicated by the multi-PDSCH grant may correspond to a combination of an MCS and a pattern of RV indications included in the single DCI. In one example, the MCS in the combination may be 26. In another example, each RV indication in the pattern of RV indications may correspond to a 1. For example, the DCI including the multi-PDSCH grant associated with the multiple PDSCHs may provide that the MCS of the multiple PDSCHs is 26 and the RVID of the multiple PDSCHs is 1 to indicate that the second TB of the multiple PDSCHs may be disabled.

In another aspect, the pattern of RV indications includes two RV indications of any two adjacent PDSCHs being different from each other. That is, the pattern of RV indications that may indicate that the second TB is disabled for each PDSCH indicated by the multi-PDSCH grant may include two RV indications of any two adjacent PDSCHs being different from each other. The pattern of RV indications may include an alternating pattern of RV indications.

For example, two TBs may be configured for the PDSCH. In one example, the multi-PDSCH grant may schedule two (2) PDSCHs, and the multi-PDSCH grant may include the pattern of the RVID of 10 or 01 for the two PDSCHs to indicate that the second TB may be disabled for the two PDSCHs scheduled by the multi-PDSCHs. In another example, the multi-PDSCH grant may schedule eight (8) PDSCHs, and The DCI including the multi-PDSCH grant may include the pattern of the RVID of 10101010 or 01010101 for the eight PDSCHs to indicate that the second TB may be disabled for the eight PDSCHs scheduled by the multi-PDSCH grant.

At 806, the network node may transmit a PDSCH indicated by the multi-PDSCH grant based on a disablement of the second TB. In one aspect, the network node may transmit each PDSCH indicated by the multi-PDSCH grant based on the disablement of the second transport block by transmitting a single transport block mapped to a first codeword of each PDSCH indicated in the multi-PDSCH grant (808). For example, at 510, 512, 518, 520, and 522, the network node 504 may transmit a PDSCH indicated by the multi-PDSCH grant based on a disablement of the second TB. Furthermore, 806 and 808 may be performed by the multi-PDSCH grant configuring component 199.

Figure 9:
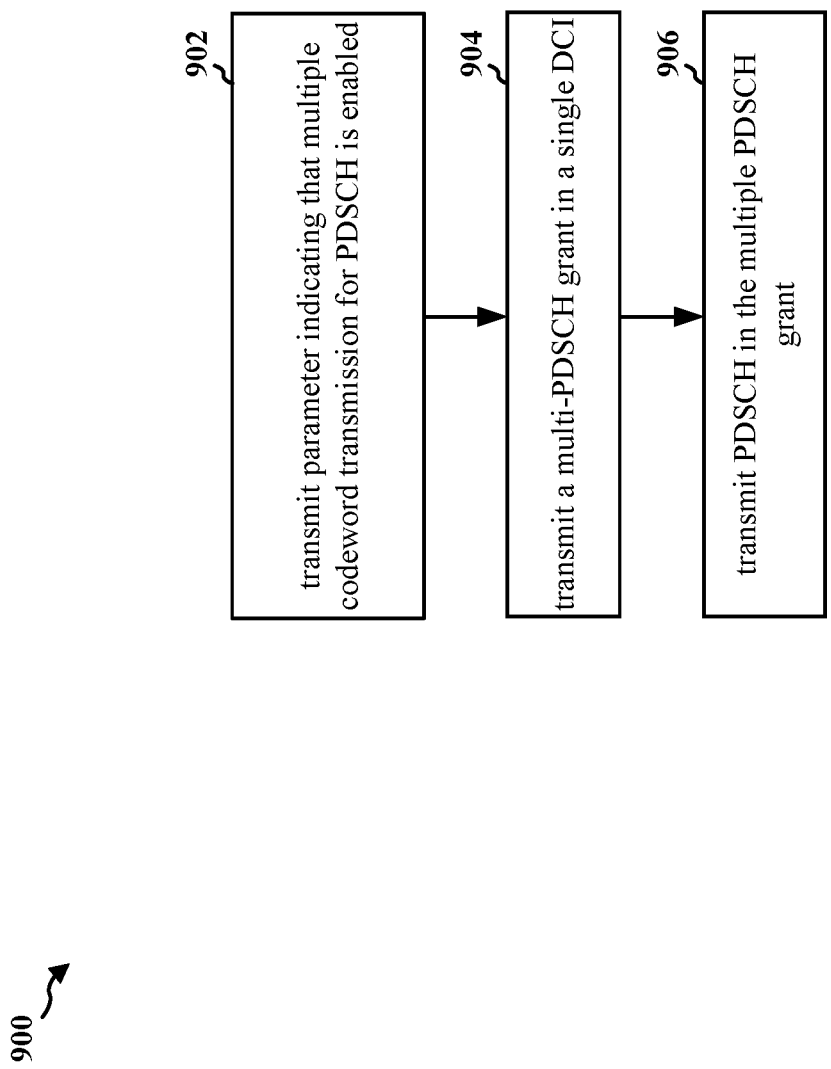
FIG. 9 is a flowchart of a method of wireless communication.

FIG. 9 is a flowchart 900 of a method of wireless communication. The method may be performed by a network node (e.g., the base station 102/180/504/1302; the network entity 1102/1206). The network node may configure the UE with more than one codeword transmission for each PDSCH and transmit DCI including multi-PDSCH grant scheduling multiple PDSCHs. The DCI may include an indication that a second TB is disabled for each PDSCH indicated by the multi-PDSCH grant. The network node may transmit each PDSCH indicated by the multi-PDSCH grant based on the disablement of the second transport block.

At 902, the network node may transmit, to the UE, a parameter indicating the two codeword transmission for PDSCH transmissions is enabled. The parameter indicating the enablement of the two codeword transmission for PDSCH transmissions may be configured using the higher layer parameter of an RRC message. For example, the parameter may include maxNrofCodeWordsScheduledByDCI=2, indicating that the maximum number of codewords is 2. For example, at 506 and 514, the network node 504 may transmit, to the UE 502, a parameter indicating that two codeword transmission for PDSCH transmissions is enabled. Furthermore, 902 may be performed by a multi-PDSCH grant configuring component 199.

At 904, the network node may transmit, to the UE, a multi-PDSCH grant in a single DCI including an indication that a second TB is disabled for each PDSCH indicated by the multi-PDSCH grant. Here, the multi-PDSCH grant may include a MCS (e.g., a common MCS) that is common to each PDSCH indicated by the multi-PDSCH grant and an individual RV indication for each PDSCH indicated by the multi-PDSCH grant. For example, at 508 and 516, the network node 504 may transmit, to the UE 502, a multi-PDSCH grant in a single DCI including an indication that a second TB is disabled for each PDSCH indicated by the multi-PDSCH grant. Furthermore, 904 may be performed by the multi-PDSCH grant configuring component 199.

In one aspect, the indication that a second TB is disabled for each PDSCH indicated by the multi-PDSCH grant may correspond to a combination of an MCS and a pattern of RV indications included in the single DCI. In one example, the MCS in the combination may be 26. In another example, each RV indication in the pattern of RV indications may correspond to a 1. For example, the DCI including the multi-PDSCH grant associated with the multiple PDSCHs may provide that the MCS of the multiple PDSCHs is 26 and the RVID of the multiple PDSCHs is 1 to indicate that the second TB of the multiple PDSCHs may be disabled.

In another aspect, the pattern of RV indications includes two RV indications of any two adjacent PDSCHs being different from each other. That is, the pattern of RV indications that may indicate that the second TB is disabled for each PDSCH indicated by the multi-PDSCH grant may include two RV indications of any two adjacent PDSCHs being different from each other. The pattern of RV indications may include an alternating pattern of RV indications.

For example, two TBs may be configured for the PDSCH. In one example, the multi-PDSCH grant may schedule two (2) PDSCHs, and the multi-PDSCH grant may include the pattern of the RVID of 10 or 01 for the two PDSCHs to indicate that the second TB may be disabled for the two PDSCHs scheduled by the multi-PDSCHs. In another example, the multi-PDSCH grant may schedule eight (8) PDSCHs, and The DCI including the multi-PDSCH grant may include the pattern of the RVID of 10101010 or 01010101 for the eight PDSCHs to indicate that the second TB may be disabled for the eight PDSCHs scheduled by the multi-PDSCH grant.

At 906, the network node may transmit a PDSCH indicated by the multi-PDSCH grant based on a disablement of the second TB. For example, at 510, 512, 518, 520, and 522, the network node 504 may transmit a PDSCH indicated by the multi-PDSCH grant based on a disablement of the second TB. Furthermore, 906 and 908 may be performed by the multi-PDSCH grant configuring component 199.

Figure 10:
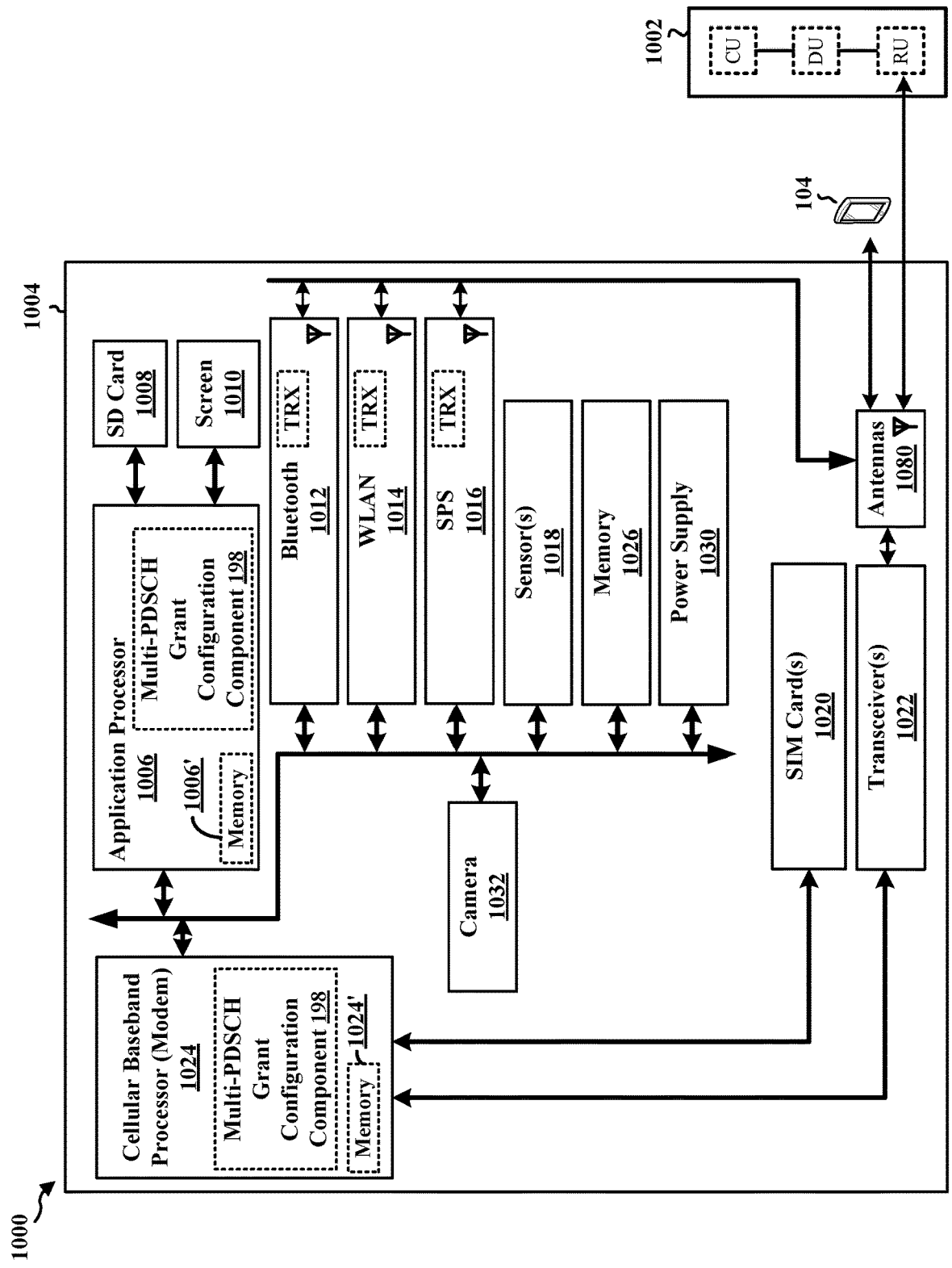
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see 350 of FIG. 3) and include the additional modules of the apparatus 1004.

As discussed supra, the multi-PDSCH grant configuration component 198 is configured to receive a parameter indicating that two codeword transmission for PDSCH transmissions is enabled by a network node, receive a multi-PDSCH grant in a single DCI comprising an indication that a second transport block is disabled for each PDSCH indicated by the multi-PDSCH grant from the network node; and receive each PDSCH indicated by the multi-PDSCH grant based on a disablement of the second transport block from the network node. The multi-PDSCH grant configuration component 198 may be within the cellular baseband processor 1024, the application processor 1006, or both the cellular baseband processor 1024 and the application processor 1006. The multi-PDSCH grant configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for receiving a parameter indicating that two codeword transmission for PDSCH transmissions is enabled by a network node, means for receiving a multi-PDSCH grant in a single DCI including an indication that a second transport block is disabled for each PDSCH indicated by the multi-PDSCH grant from the network node, and means for receiving each PDSCH indicated by the multi-PDSCH grant based on a disablement of the second transport block from the network node. In one configuration, the multi-PDSCH grant includes a MCS (e.g., a common MCS) that is common to each PDSCH indicated by the multi-PDSCH grant and an individual RV indication for each PDSCH indicated by the multi-PDSCH grant. In one configuration, the indication corresponds to a combination of the MCS and a pattern of RV indications included in the single DCI. In one configuration, each RV indication in the pattern of RV indications corresponds to a value of 1. In one configuration, the pattern of RV indications includes two RV indications of any two adjacent PDSCHs being different from each other. In one configuration, the pattern of RV indications includes an alternating pattern of RV indications. In one configuration, the MCS in the combination is 26. In one configuration, the means for receiving each PDSCH indicated by the multi-PDSCH grant based on the disablement of the second transport block, the at least one processor is further configured to receive a single transport block mapped to a first codeword of each PDSCH indicated in the multi-PDSCH grant. The means may be the multi-PDSCH grant configuration component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
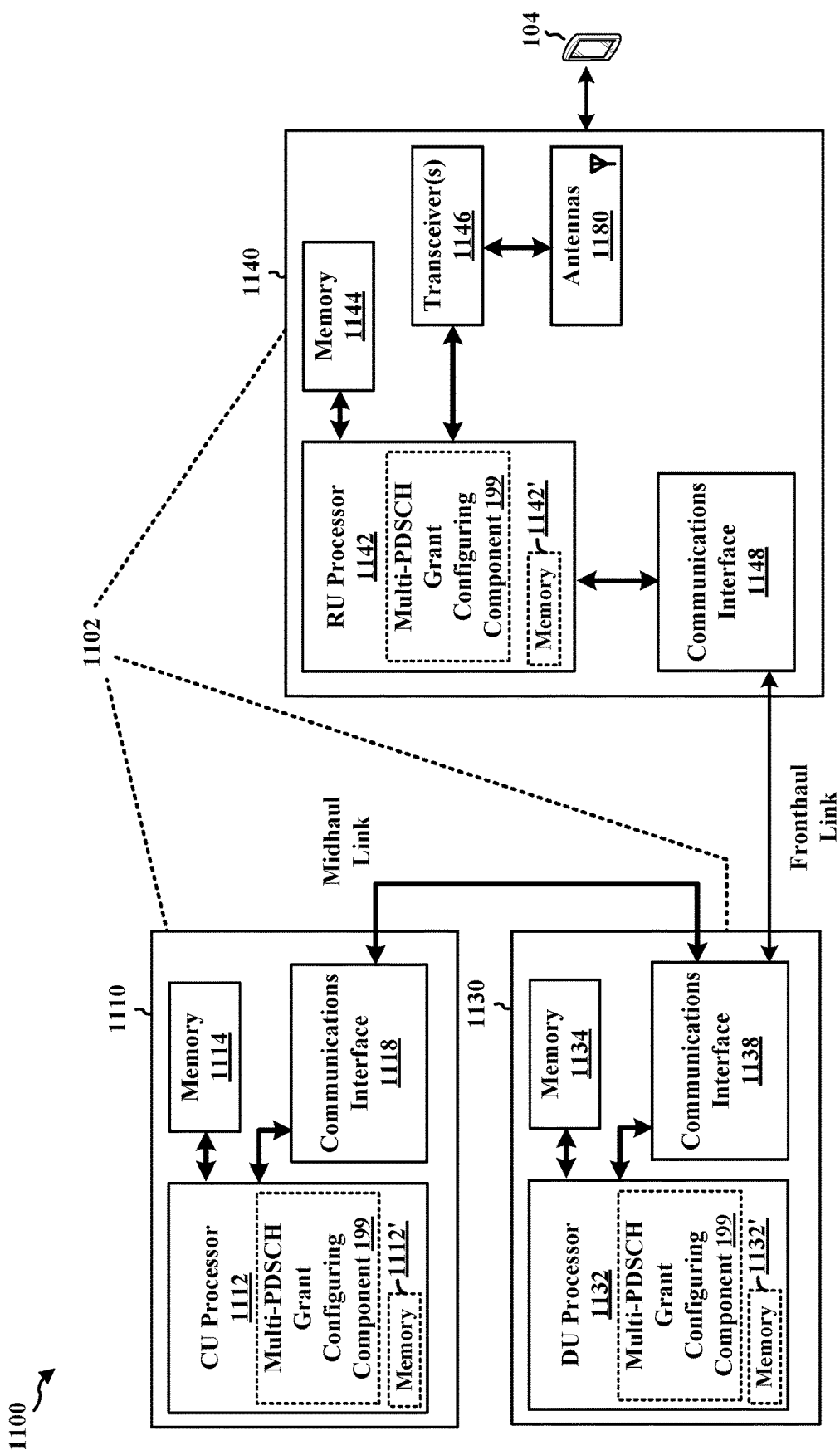
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the multi-PDSCH grant configuring component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the multi-PDSCH grant configuring component 199 is configured to transmit a parameter indicating that two codeword transmission for PDSCH transmissions is enabled for a UE, transmit a multi-PDSCH grant in a single DCI comprising an indication that a second transport block is disabled for each PDSCH indicated by the multi-PDSCH grant for the UE, and transmit each PDSCH indicated by the multi-PDSCH grant based on a disablement of the second transport block for the UE. The multi-PDSCH grant configuring component 199 may be within one or more processors of one or more of the CU 1110, DU 1130, and the RU 1140. The multi-PDSCH grant configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for transmitting a parameter indicating that two codeword transmission for PDSCH transmissions is enabled for a UE, means for transmitting a multi-PDSCH grant in a single DCI including an indication that a second transport block is disabled for each PDSCH indicated by the multi-PDSCH grant for the UE, and means for transmitting each PDSCH indicated by the multi-PDSCH grant based on a disablement of the second transport block for the UE. In one configuration, the multi-PDSCH grant includes a MCS (e.g., a common MCS) that is common to each PDSCH indicated by the multi-PDSCH grant and an individual RV indication for each PDSCH indicated by the multi-PDSCH grant. In one configuration, the indication corresponds to a combination of the MCS and a pattern of RV indications included in the single DCI. In one configuration, each RV indication in the pattern of RV indications corresponds to a value of 1. In one configuration, the pattern of RV indications includes two RV indications of any two adjacent PDSCHs being different from each other. In one configuration, the pattern of RV indications includes an alternating pattern of RV indications. In one configuration, the MCS in the combination is 26. In one configuration, the means for transmitting each PDSCH indicated by the multi-PDSCH grant based on the disablement of the second transport block, the at least one processor is further configured to transmit a single transport block mapped to a first codeword of each PDSCH indicated in the multi-PDSCH grant for the UE. The means may be the multi-PDSCH grant configuring component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 12:
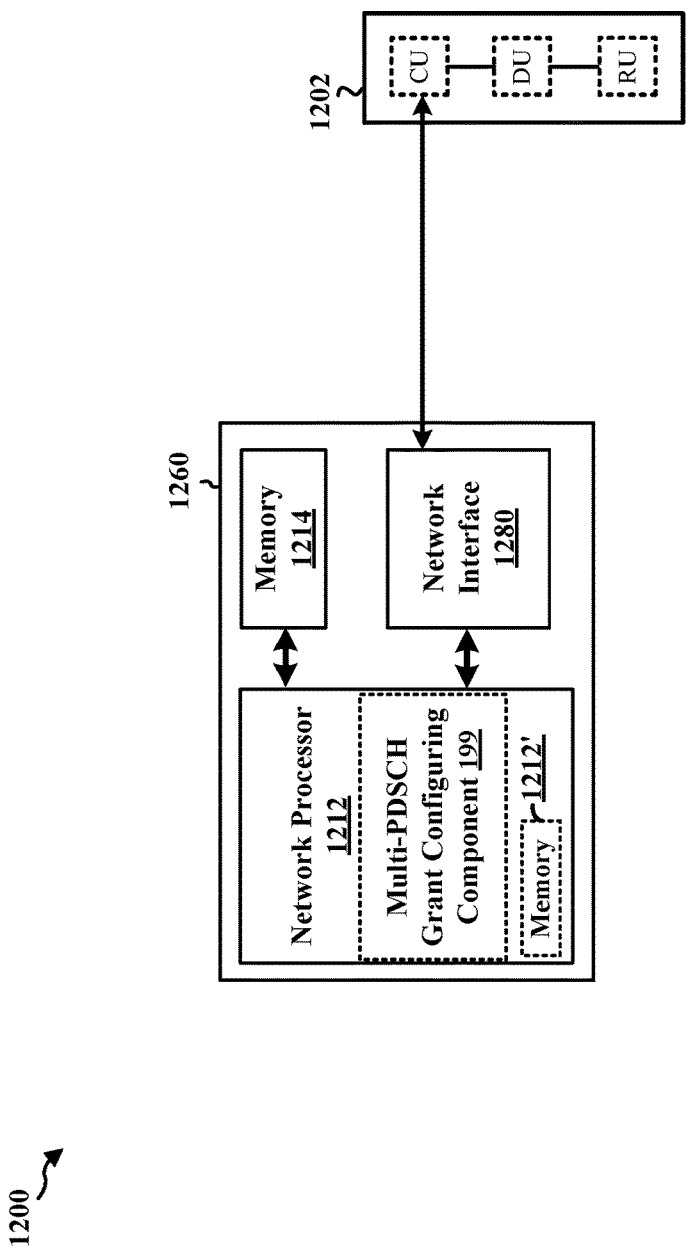
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include a network processor 1212. The network processor 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The processor 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the multi-PDSCH grant configuring component 199 is configured to transmit a parameter indicating that two codeword transmission for PDSCH transmissions is enabled for a UE, transmit a multi-PDSCH grant in a single DCI comprising an indication that a second transport block is disabled for each PDSCH indicated by the multi-PDSCH grant for the UE, and transmit each PDSCH indicated by the multi-PDSCH grant based on a disablement of the second transport block for the UE. The multi-PDSCH grant configuring component 199 may be within the processor 1212. The multi-PDSCH grant configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1260 may include a variety of components configured for various functions. In one configuration, the network entity 1260 includes means for transmitting a parameter indicating that two codeword transmission for PDSCH transmissions is enabled for a UE, means for transmitting a multi-PDSCH grant in a single DCI including an indication that a second transport block is disabled for each PDSCH indicated by the multi-PDSCH grant for the UE, and means for transmitting each PDSCH indicated by the multi-PDSCH grant based on a disablement of the second transport block for the UE. In one configuration, the multi-PDSCH grant includes a MCS (e.g., a common MCS) that is common to each PDSCH indicated by the multi-PDSCH grant and an individual RV indication for each PDSCH indicated by the multi-PDSCH grant. In one configuration, the indication corresponds to a combination of the MCS and a pattern of RV indications included in the single DCI. In one configuration, each RV indication in the pattern of RV indications corresponds to a value of 1. In one configuration, the pattern of RV indications includes two RV indications of any two adjacent PDSCHs being different from each other. In one configuration, the pattern of RV indications includes an alternating pattern of RV indications. In one configuration, the MCS in the combination is 26. In one configuration, the means for transmitting each PDSCH indicated by the multi-PDSCH grant based on the disablement of the second transport block, the at least one processor is further configured to transmit a single transport block mapped to a first codeword of each PDSCH indicated in the multi-PDSCH grant for the UE. The means may be the multi-PDSCH grant configuring component 199 of the network entity 1260 configured to perform the functions recited by the means.

Figure 13:
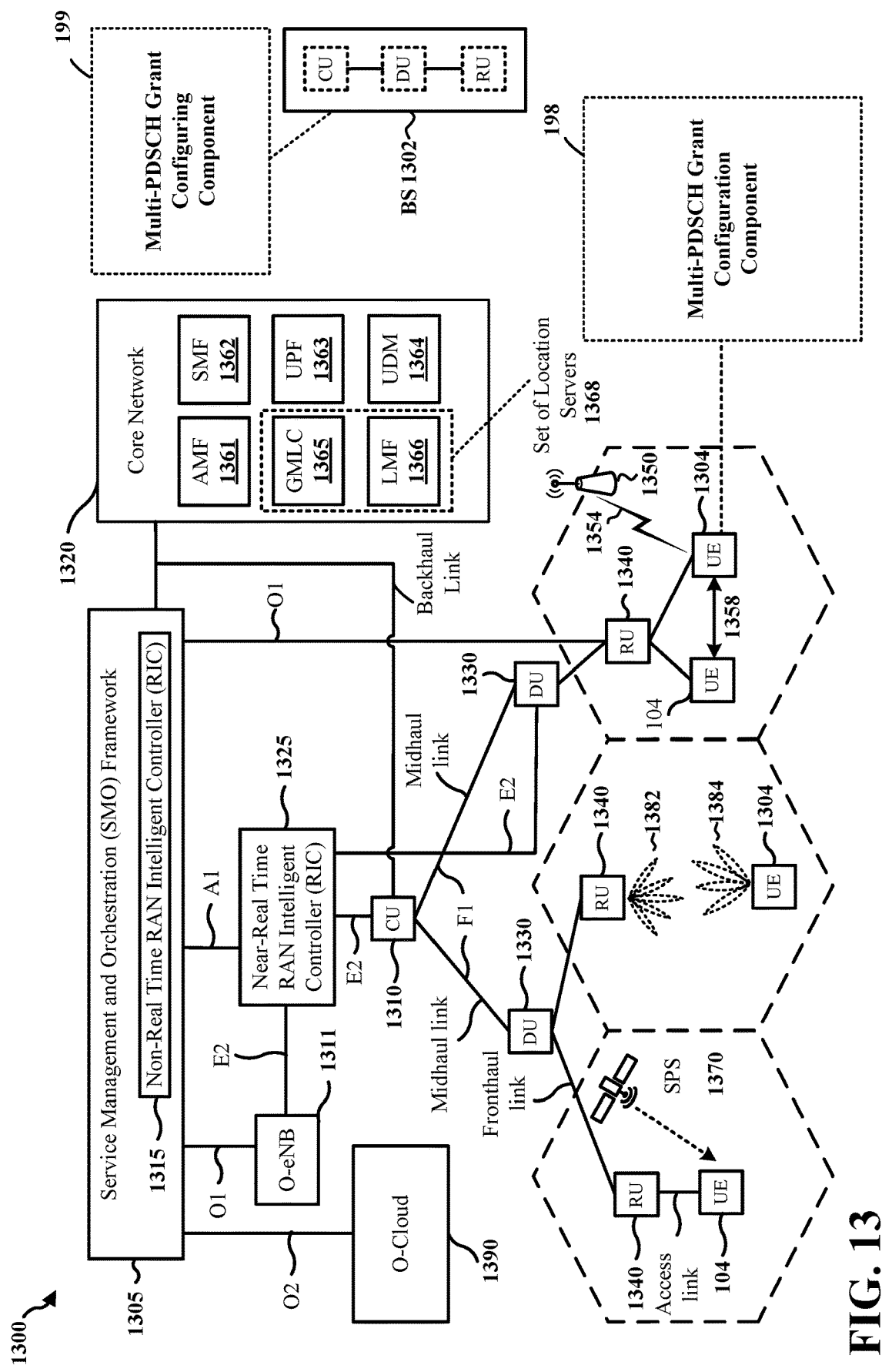
FIG. 13 is a diagram illustrating another example of a wireless communications system and an access network.

FIG. 13 is a diagram 1300 illustrating another example of a wireless communications system and an access network. The illustrated wireless communications system includes a disaggregated base station architecture. The disaggregated base station architecture may include one or more CUs 1310 that can communicate directly with a core network 1320 via a backhaul link, or indirectly with the core network 1320 through one or more disaggregated base station units (such as a Near-Real Time (Near-RT) RAN Intelligent Controller (RIC) 1325 via an E2 link, or a Non-Real Time (Non-RT) RIC 1315 associated with a Service Management and Orchestration (SMO) Framework 1305, or both). A CU 1310 may communicate with one or more DUs 1330 via respective midhaul links, such as an F1 interface. The DUs 1330 may communicate with one or more RUs 1340 via respective fronthaul links. The RUs 1340 may communicate with respective UEs 1304 via one or more radio frequency (RF) access links. In some implementations, the UE 1304 may be simultaneously served by multiple RUs 1340.

Each of the units, i.e., the CUs 1310, the DUs 1330, the RUs 1340, as well as the Near-RT RICs 1325, the Non-RT RICs 1315, and the SMO Framework 1305, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 1310 may host one or more higher layer control functions. Such control functions can include RRC, PDCP, SDAP, or the like. Each control function can be implemented with an interface configured to communicate signals with other control functions hosted by the CU 1310. The CU 1310 may be configured to handle user plane functionality (i.e., Central Unit-User Plane (CU-UP)), control plane functionality (i.e., Central Unit-Control Plane (CU-CP)), or a combination thereof. In some implementations, the CU 1310 can be logically split into one or more CU-UP units and one or more CU-CP units. The CU-UP unit can communicate bidirectionally with the CU-CP unit via an interface, such as an E1 interface when implemented in an O-RAN configuration. The CU 1310 can be implemented to communicate with the DU 1330, as necessary, for network control and signaling.

The DU 1330 may correspond to a logical unit that includes one or more base station functions to control the operation of one or more RUs 1340. In some aspects, the DU 1330 may host one or more of an RLC layer, a MAC layer, and one or more high PHY layers (such as modules for FEC encoding and decoding, scrambling, modulation, demodulation, or the like) depending, at least in part, on a functional split, such as those defined by 3GPP. In some aspects, the DU 1330 may further host one or more low PHY layers. Each layer (or module) can be implemented with an interface configured to communicate signals with other layers (and modules) hosted by the DU 1330, or with the control functions hosted by the CU 1310.

Lower-layer functionality can be implemented by one or more RUs 1340. In some deployments, an RU 1340, controlled by a DU 1330, may correspond to a logical node that hosts RF processing functions, or low-PHY layer functions (such as performing FFT, iFFT, digital beamforming, physical random access channel (PRACH) extraction and filtering, or the like), or both, based at least in part on the functional split, such as a lower layer functional split. In such an architecture, the RU(s) 1340 can be implemented to handle over the air (OTA) communication with one or more UEs 1304. In some implementations, real-time and non-real-time aspects of control and user plane communication with the RU(s) 1340 can be controlled by the corresponding DU 1330. In some scenarios, this configuration can enable the DU(s) 1330 and the CU 1310 to be implemented in a cloud-based RAN architecture, such as a vRAN architecture.

The SMO Framework 1305 may be configured to support RAN deployment and provisioning of non-virtualized and virtualized network elements. For non-virtualized network elements, the SMO Framework 1305 may be configured to support the deployment of dedicated physical resources for RAN coverage requirements that may be managed via an operations and maintenance interface (such as an O1 interface). For virtualized network elements, the SMO Framework 1305 may be configured to interact with a cloud computing platform (such as an open cloud (O-Cloud) 1390) to perform network element life cycle management (such as to instantiate virtualized network elements) via a cloud computing platform interface (such as an O2 interface). Such virtualized network elements can include, but are not limited to, CUs 1310, DUs 1330, RUs 1340 and Near-RT RICs 1325. In some implementations, the SMO Framework 1305 can communicate with a hardware aspect of a 4G RAN, such as an open eNB (O-eNB) 1311, via an O1 interface. Additionally, in some implementations, the SMO Framework 1305 can communicate directly with one or more RUs 1340 via an O1 interface. The SMO Framework 1305 also may include a Non-RT RIC 1315 configured to support functionality of the SMO Framework 1305.

The Non-RT RIC 1315 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 1325. The Non-RT RIC 1315 may be coupled to or communicate with (such as via an A1 interface) the Near-RT RIC 1325. The Near-RT RIC 1325 may be configured to include a logical function that enables near-real-time control and optimization of RAN elements and resources via data collection and actions over an interface (such as via an E2 interface) connecting one or more CUs 1310, one or more DUs 1330, or both, as well as an O-eNB, with the Near-RT RIC 1325.

In some implementations, to generate AI/ML models to be deployed in the Near-RT RIC 1325, the Non-RT RIC 1315 may receive parameters or external enrichment information from external servers. Such information may be utilized by the Near-RT RIC 1325 and may be received at the SMO Framework 1305 or the Non-RT RIC 1315 from non-network data sources or from network functions. In some examples, the Non-RT RIC 1315 or the Near-RT RIC 1325 may be configured to tune RAN behavior or performance. For example, the Non-RT RIC 1315 may monitor long-term trends and patterns for performance and employ AI/ML models to perform corrective actions through the SMO Framework 1305 (such as reconfiguration via O1) or via creation of RAN management policies (such as A1 policies).

At least one of the CU 1310, the DU 1330, and the RU 1340 may be referred to as a base station 1302. Accordingly, a base station 1302 may include one or more of the CU 1310, the DU 1330, and the RU 1340 (each component indicated with dotted lines to signify that each component may or may not be included in the base station 1302). The base station 1302 provides an access point to the core network 1320 for a UE 1304. The base stations 1302 may include macrocells (high power cellular base station) and/or small cells (low power cellular base station). The small cells include femtocells, picocells, and microcells. A network that includes both small cell and macrocells may be known as a heterogeneous network. A heterogeneous network may also include HeNBs, which may provide service to a restricted group known as a CSG. The communication links between the RUs 1340 and the UEs 1304 may include UL (also referred to as reverse link) transmissions from a UE 1304 to an RU 1340 and/or DL (also referred to as forward link) transmissions from an RU 1340 to a UE 1304. The communication links may use MIMO antenna technology, including spatial multiplexing, beamforming, and/or transmit diversity. The communication links may be through one or more carriers. The base stations 1302/UEs 1304 may use spectrum up to Y MHz (e.g., 5, 130, 135, 20, 1300, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a PCell and a secondary component carrier may be referred to as a SCell.

Certain UEs 1304 may communicate with each other using device-to-device (D2D) communication link 1358. The D2D communication link 1358 may use the DL/UL WWAN spectrum. The D2D communication link 1358 may use one or more sidelink channels, such as a PSBCH, a PSDCH, a PSSCH, and a PSCCH. D2D communication may be through a variety of wireless D2D communications systems, such as for example, Bluetooth, Wi-Fi based on the IEEE 802.11 standard, LTE, or NR.

The wireless communications system may further include a Wi-Fi AP 1350 in communication with UEs 1304 (also referred to as Wi-Fi stations (STAs)) via communication link 1354, e.g., in a 5 GHz unlicensed frequency spectrum or the like. When communicating in an unlicensed frequency spectrum, the UEs 1304/AP 1350 may perform a CCA prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the ITU as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 1302 and the UE 1304 may each include a plurality of antennas, such as antenna elements, antenna panels, and/or antenna arrays to facilitate beamforming. The base station 1302 may transmit a beamformed signal 1382 to the UE 1304 in one or more transmit directions. The UE 1304 may receive the beamformed signal from the base station 1302 in one or more receive directions. The UE 1304 may also transmit a beamformed signal 1384 to the base station 1302 in one or more transmit directions. The base station 1302 may receive the beamformed signal from the UE 1304 in one or more receive directions. The base station 1302/UE 1304 may perform beam training to determine the best receive and transmit directions for each of the base station 1302/UE 1304. The transmit and receive directions for the base station 1302 may or may not be the same. The transmit and receive directions for the UE 1304 may or may not be the same.

The base station 1302 may include and/or be referred to as a gNB, Node B, eNB, an access point, a base transceiver station, a radio base station, a radio transceiver, a transceiver function, a BSS, an ESS, a TRP, network node, network entity, network equipment, or some other suitable terminology. The base station 1302 can be implemented as an IAB node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 1320 may include an AMF 1361, a SMF 1362, a UPF 1363, a UDM 1364, one or more location servers 1368, and other functional entities. The AMF 1361 is the control node that processes the signaling between the UEs 1304 and the core network 1320. The AMF 1361 supports registration management, connection management, mobility management, and other functions. The SMF 1362 supports session management and other functions. The UPF 1363 supports packet routing, packet forwarding, and other functions. The UDM 1364 supports the generation of authentication and key agreement (AKA) credentials, user identification handling, access authorization, and subscription management. The one or more location servers 1368 are illustrated as including a Gateway Mobile Location Center (GMLC) 1365 and a Location Management Function (LMF) 1366. However, generally, the one or more location servers 1368 may include one or more location/positioning servers, which may include one or more of the GMLC 1365, the LMF 1366, a position determination entity (PDE), a serving mobile location center (SMLC), a mobile positioning center (MPC), or the like. The GMLC 1365 and the LMF 1366 support UE location services. The GMLC 1365 provides an interface for clients/applications (e.g., emergency services) for accessing UE positioning information. The LMF 1366 receives measurements and assistance information from the NG-RAN and the UE 1304 via the AMF 1361 to compute the position of the UE 1304. The NG-RAN may utilize one or more positioning methods in order to determine the position of the UE 1304. Positioning the UE 1304 may involve signal measurements, a position estimate, and an optional velocity computation based on the measurements. The signal measurements may be made by the UE 1304 and/or the serving base station 1302. The signals measured may be based on one or more of a satellite positioning system (SPS) 1370 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 1304 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 1304 may be referred to as IoT devices (e.g., parking meter, gas pump, toaster, vehicles, heart monitor, etc.). The UE 1304 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 13, in certain aspects, the UE 1304 may include a multi-PDSCH grant configuration component 198 configured to receive a parameter indicating that two codeword transmission for PDSCH transmissions is enabled by a network node, receive a multi-PDSCH grant in a single DCI comprising an indication that a second transport block is disabled for each PDSCH indicated by the multi-PDSCH grant from the network node; and receive each PDSCH indicated by the multi-PDSCH grant based on a disablement of the second transport block from the network node. In certain aspects, the base station 1302 may include a multi-PDSCH grant configuring component 199 configured to transmit a parameter indicating that two codeword transmission for PDSCH transmissions is enabled for a UE, transmit a multi-PDSCH grant in a single DCI comprising an indication that a second transport block is disabled for each PDSCH indicated by the multi-PDSCH grant for the UE, and transmit each PDSCH indicated by the multi-PDSCH grant based on a disablement of the second transport block for the UE. Although the following description may be focused on 5G NR, the concepts described herein may be applicable to other similar areas, such as LTE, LTE-A, CDMA, GSM, and other wireless technologies.

According to the aspects of the current disclosure, the network node may configure the UE with more than one codeword transmission for each PDSCH and transmit DCI including multi-PDSCH grant scheduling multiple PDSCHs. The DCI may include an indication that a second TB is disabled for each PDSCH indicated by the multi-PDSCH grant. The UE may receive the DCI including multi-PDSCH grant scheduling multiple PDSCHs, the DCI including the indication that the second TB is disabled for each PDSCH indicated by the multi-PDSCH grant, and understand that the multiple PDSCHs scheduled by the multi-PDSCH grant. In one aspect, the indication may include a combination of the MCS and the RV vector (or RVID) value of the associated multiple PDSCHs. In another aspect, the indication may include a pattern of the RV vector (or RVID) values of associated multiple PDSCHs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving a parameter indicating that two codeword transmission for PDSCH transmissions is enabled by a network node, receiving a multi-PDSCH grant in a single DCI including an indication that a second transport block is disabled for each PDSCH indicated by the multi-PDSCH grant from the network node, and receiving each PDSCH indicated by the multi-PDSCH grant based on a disablement of the second transport block from the network node.

Aspect 2 is the method of aspect 1, where the multi-PDSCH grant includes a MCS that is common to each PDSCH indicated by the multi-PDSCH grant and an individual RV indication for each PDSCH indicated by the multi-PDSCH grant.

Aspect 3 is the method of aspect 2, where the indication corresponds to a combination of the MCS and a pattern of RV indications included in the single DCI.

Aspect 4 is the method of aspect 3, where each RV indication in the pattern of RV indications corresponds to a value of 1.

Aspect 5 is the method of any of aspects 3 to 4, where the pattern of RV indications includes two RV indications of any two adjacent PDSCHs being different from each other.

Aspect 6 is the method of any of aspects 3 to 5, where the pattern of RV indications includes an alternating pattern of RV indications.

Aspect 7 is the method of any of aspects 3 to 6, where the MCS in the combination is 26.

Aspect 8 is the method of any of aspects 1 to 7, where, receiving each PDSCH indicated by the multi-PDSCH grant based on the disablement of the second transport block, the at least one processor further includes receiving a single transport block mapped to a first codeword of each PDSCH indicated in the multi-PDSCH grant.

Aspect 9 is an apparatus for wireless communication including at least one processor coupled to a memory and configured to implement any of aspects 1 to 8, further including a transceiver coupled to the at least one processor.

Aspect 10 is an apparatus for wireless communication including means for implementing any of aspects 1 to 8.

Aspect 11 is a non-transitory computer-readable medium storing computer executable code, where the code when executed by a processor causes the processor to implement any of aspects 1 to 8.

Aspect 12 is a method of wireless communication at a network node, including transmitting a parameter indicating that two codeword transmission for PDSCH transmissions is enabled for a UE, transmitting a multi-PDSCH grant in a single DCI including an indication that a second transport block is disabled for each PDSCH in the multi-PDSCH grant for the UE, and transmitting each PDSCH indicated by the multi-PDSCH grant based on a disablement of the second transport block for the UE.

Aspect 13 is the method of aspect 12, where the multi-PDSCH grant includes a MCS that is common to each PDSCH indicated by the multi-PDSCH grant and an individual RV indication for each PDSCH indicated by the multi-PDSCH grant.

Aspect 14 is the method of aspect 13, where the indication corresponds to a combination of the MCS and a pattern of RV indications included in the single DCI.

Aspect 15 is the method of aspect 14, where each RV indication in the pattern of RV indications corresponds to a value of 1.

Aspect 16 is the method of any of aspects 14 and 15, where the pattern of RV indications includes two RV indications of any two adjacent PDSCHs being different from each other.

Aspect 17 is the method of any of aspects 14 to 16, where the pattern of RV indications includes an alternating pattern of RV indications.

Aspect 18 is the method of any of aspects 14 to 17, where the MCS in the combination is 26.

Aspect 19 is the method of any of aspects 12 to 18, where, transmitting each PDSCH indicated by the multi-PDSCH grant based on the disablement of the second transport block, the at least one processor further includes transmitting a single transport block mapped to a first codeword of each PDSCH indicated in the multi-PDSCH grant for the UE.

Aspect 20 is an apparatus for wireless communication including at least one processor coupled to a memory and configured to implement any of aspects 12 to 19, further including a transceiver coupled to the at least one processor.

Aspect 21 is an apparatus for wireless communication including means for implementing any of aspects 12 to 19.

Aspect 22 is a non-transitory computer-readable medium storing computer executable code, where the code when executed by a processor causes the processor to implement any of aspects 12 to 19.

What is claimed is:

1. An apparatus for wireless communication at a user equipment (UE), comprising:
    a memory; and
    at least one processor coupled to the memory configured to:
        receive a parameter indicating that two codeword transmission for physical downlink shared channel (PDSCH) transmissions is enabled by a network node, wherein the parameter is a higher layer parameter of an RRC message;
        receive a multi-PDSCH grant in a single downlink control information (DCI) comprising an indication that a second transport block is disabled for each PDSCH indicated by the multi-PDSCH grant from the network node, wherein the multi-PDSCH grant includes a modulation and coding scheme (MCS) that is common to each PDSCH indicated by the multi-PDSCH grant and an individual redundancy version (RV) indication for each PDSCH indicated by the multi-PDSCH grant; and
        receive each PDSCH indicated by the multi-PDSCH grant based on a disablement of the second transport block from the network node.

2. The apparatus of claim 1, wherein the indication corresponds to a combination of the MCS and a pattern of RV indications comprised in the single DCI.

3. The apparatus of claim 2, wherein each RV indication in the pattern of RV indications corresponds to a value of 1.

4. The apparatus of claim 2, wherein the pattern of RV indications includes two RV indications of any two adjacent PDSCHs being different from each other.

5. The apparatus of claim 2, wherein the pattern of RV indications comprises an alternating pattern of RV indications.

6. The apparatus of claim 2, wherein the MCS in the combination is 26.

7. The apparatus of claim 1, further comprising a transceiver coupled to the at least one processor,
wherein, to receive each PDSCH indicated by the multi-PDSCH grant based on the disablement of the second transport block, the at least one processor is further configured to:
    receive a single transport block mapped to a first codeword of each PDSCH indicated in the multi-PDSCH grant.

8. An apparatus for wireless communication at a network node, comprising:
    a memory; and
    at least one processor coupled to the memory configured to:
        transmit a parameter indicating that two codeword transmission for physical downlink shared channel (PDSCH) transmissions is enabled for a user equipment (UE), wherein the parameter is a higher layer parameter of an RRC message;
        transmit a multi-PDSCH grant in a single downlink control information (DCI) comprising an indication that a second transport block is disabled for each PDSCH indicated by the multi-PDSCH grant for the UE, wherein the multi-PDSCH grant includes a modulation and coding scheme (MCS) that is common to each PDSCH indicated by the multi-PDSCH grant and an individual redundancy version (RV) indication for each PDSCH indicated by the multi-PDSCH grant; and
        transmit each PDSCH indicated by the multi-PDSCH grant based on a disablement of the second transport block for the UE.

9. The apparatus of claim 8, wherein the indication corresponds to a combination of the MCS and a pattern of RV indications comprised in the single DCI.

10. The apparatus of claim 9, wherein each RV indication in the pattern of RV indications corresponds to a value of 1.

11. The apparatus of claim 9, wherein the pattern of RV indications includes two RV indications of any two adjacent PDSCHs being different from each other.

12. The apparatus of claim 9, wherein the pattern of RV indications comprises an alternating pattern of RV indications.

13. The apparatus of claim 9, wherein the MCS in the combination is 26.

14. The apparatus of claim 8, further comprising a transceiver coupled to the at least one processor,
wherein, to transmit each PDSCH indicated by the multi-PDSCH grant based on the disablement of the second transport block, the at least one processor is further configured to:
    transmit a single transport block mapped to a first codeword of each PDSCH indicated in the multi-PDSCH grant for the UE.

15. A method for wireless communication at a user equipment (UE), comprising:
    receiving a parameter indicating that two codeword transmission for physical downlink shared channel (PDSCH) transmissions is enabled by a network node, wherein the parameter is a higher layer parameter of an RRC message;
    receiving a multi-PDSCH grant in a single downlink control information (DCI) comprising an indication that a second transport block is disabled for each PDSCH indicated by the multi-PDSCH grant from the network node, wherein the multi-PDSCH grant includes a modulation and coding scheme (MCS) that is common to each PDSCH indicated by the multi- PDSCH grant and an individual redundancy version (RV) indication for each PDSCH indicated by the multi-PDSCH grant; and receiving each PDSCH indicated by the multi-PDSCH grant based on a disablement of the second transport block from the network node.

16. The method of claim 15, wherein the indication corresponds to a combination of the MCS and a pattern of RV indications comprised in the single DCI.

17. The method of claim 16, wherein each RV indication in the pattern of RV indications corresponds to a value of 1.

18. The method of claim 16, wherein the MCS in the combination is 26.

19. The method of claim 16, wherein the pattern of RV indications comprises an alternating pattern of RV indications.

20. The method of claim 15, wherein receiving each PDSCH indicated by the multi-PDSCH grant based on the disablement of the second transport block further comprises:
receiving a single transport block mapped to a first codeword of each PDSCH indicated in the multi-PDSCH grant.

21. A method of wireless communication at a network node, comprising:
transmitting a parameter indicating that two codeword transmission for physical downlink shared channel (PDSCH) transmissions is enabled for a user equipment (UE), wherein the parameter is a higher layer parameter of an RRC message;
transmitting a multi-PDSCH grant in a single downlink control information (DCI) comprising an indication that a second transport block is disabled for each PDSCH indicated by the multi-PDSCH grant for the UE, wherein the multi-PDSCH grant includes a modulation and coding scheme (MCS) that is common to each PDSCH indicated by the multi-PDSCH grant and an individual redundancy version (RV) indication for each PDSCH indicated by the multi-PDSCH grant; and
transmitting each PDSCH indicated by the multi-PDSCH grant based on a disablement of the second transport block for the UE.

22. The method of claim 21, wherein the indication corresponds to a combination of the MCS and a pattern of RV indications comprised in the single DCI.

23. The method of claim 22, wherein each RV indication in the pattern of RV indications corresponds to a value of 1.

24. The method of claim 22, wherein the MCS in the combination is 26.

25. The method of claim 22, wherein the pattern of RV indications comprises an alternating pattern of RV indications.

26. The method of claim 21, wherein transmitting each PDSCH indicated by the multi-PDSCH grant based on the disablement of the second transport block further comprises:
transmitting a single transport block mapped to a first codeword of each PDSCH indicated in the multi-PDSCH grant.

* * * * *